(12) United States Patent
Rom et al.

(10) Patent No.: US 10,653,949 B2
(45) Date of Patent: *May 19, 2020

(54) METHOD AND APPARATUS FOR DETERMINING PERFORMANCE OF A GAMER

(71) Applicant: STEELSERIES ApS, Frederiksberg (DK)

(72) Inventors: Kim Rom, San Francisco, CA (US); Jeffrey Nicholas Mahlmeister, Glenview, IL (US); Jacob Wolff-Petersen, Richmond (GB); Bruce Hawver, Hawthorn Woods, IL (US); Francis Arnold Grever, Palatine, IL (US); Tino Soelberg, Chicago, IL (US); Christopher John Nicolella, Elk Grove Village, IL (US)

(73) Assignee: STEELSERIES ApS, Frederiksberg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,699

(22) Filed: Oct. 12, 2018

(65) Prior Publication Data
US 2019/0038967 A1 Feb. 7, 2019

Related U.S. Application Data

(63) Continuation of application No. 15/883,562, filed on Jan. 30, 2018, now Pat. No. 10,124,248, which is a (Continued)

(51) Int. Cl.
*A63F 13/00* (2014.01)
*A63F 13/22* (2014.01)
(Continued)

(52) U.S. Cl.
CPC .............. *A63F 13/22* (2014.09); *A63F 13/25* (2014.09); *A63F 13/42* (2014.09); *A63F 13/79* (2014.09);
(Continued)

(58) Field of Classification Search
None
See application file for complete search history.

(56) References Cited

U.S. PATENT DOCUMENTS 6,319,121 B1* 11/2001 Yamada .................. A63F 13/10
463/8
6,464,585 B1* 10/2002 Miyamoto ........... G10H 1/0008
463/30

(Continued)

OTHER PUBLICATIONS

Beyond Gaming, "Hypefestation is Back", http://www.beyondgaming.com, website last visited Dec. 29, 2011; pp. 1-3.
(Continued)

*Primary Examiner* — Paul A D'Agostino
(74) *Attorney, Agent, or Firm* — Guntin & Gust, PLC; Andrew C. Gust

(57) ABSTRACT

A system that incorporates teachings of the present disclosure may include, for example, a method for detecting a plurality of stimulus signals generated by a gaming accessory device, identifying a plurality of substitute gaming stimulations associated with the plurality of stimulus signals, substituting the plurality of stimulus signals with the plurality of substitute gaming stimulations, incorporating in each of the plurality of substitute gaming stimulations a first unique identifier to generate a plurality of updated substitute gaming stimulations, transmitting the plurality of updated substitute gaming stimulations to a computing device executing a gaming application, and receiving from the computing device a plurality of game action results, where each of the plurality of gaming action results comprises the
(Continued)

first unique identifier of a corresponding one of the plurality of updated substitute gaming stimulations. Additional embodiments are disclosed.

20 Claims, 14 Drawing Sheets

Related U.S. Application Data continuation of application No. 15/264,198, filed on Sep. 13, 2016, now Pat. No. 9,914,049, which is a continuation of application No. 13/340,663, filed on Dec. 29, 2011, now Pat. No. 9,474,969.

(51) Int. Cl.
*A63F 13/98* (2014.01)
*A63F 13/79* (2014.01)
*A63F 13/42* (2014.01)
*A63F 13/25* (2014.01)

(52) U.S. Cl.
CPC ........ *A63F 13/98* (2014.09); *A63F 2300/303* (2013.01); *A63F 2300/305* (2013.01)

(56) References Cited

U.S. PATENT DOCUMENTS

| | | | |
|---|---|---|---|
| 6,572,478 B2 * | 6/2003 | Miyamoto | A63F 13/10 463/43 |
| 6,585,593 B1 * | 7/2003 | Okano | A63F 9/0291 463/31 |
| 6,757,572 B1 | 6/2004 | Forest | |
| 7,762,891 B2 * | 7/2010 | Miyamoto | A63F 13/10 463/23 |
| 8,169,414 B2 | 5/2012 | Lim et al. | |
| 8,317,615 B2 * | 11/2012 | Takeda | A63F 13/02 273/138.2 |
| 8,368,646 B2 | 2/2013 | Welland et al. | |
| 8,448,094 B2 | 5/2013 | Kipman et al. | |
| 8,719,714 B2 | 5/2014 | Aronzon et al. | |
| 8,992,325 B2 * | 3/2015 | Rom | A63F 13/02 463/37 |
| 2002/0097229 A1 | 7/2002 | Rose et al. | |
| 2003/0126035 A1 * | 7/2003 | Kake | A63F 13/10 463/31 |
| 2006/0282873 A1 | 12/2006 | Zalewski et al. | |
| 2007/0093291 A1 * | 4/2007 | Hulvey | A63F 13/06 463/36 |
| 2007/0155506 A1 * | 7/2007 | Malik | A63F 13/12 463/42 |
| 2008/0242399 A1 | 10/2008 | Toneguzzo et al. | |
| 2008/0254882 A1 * | 10/2008 | Watanabe | A63F 13/005 463/31 |
| 2009/0117958 A1 * | 5/2009 | Ueshima | A63F 13/10 463/8 |
| 2009/0117963 A1 | 5/2009 | Lind et al. | |
| 2009/0143141 A1 | 6/2009 | Wells et al. | |
| 2009/0156136 A1 * | 6/2009 | Shimizu | A63F 13/06 455/74.1 |
| 2009/0170595 A1 | 7/2009 | Walker et al. | |
| 2009/0325686 A1 | 12/2009 | Davis et al. | |
| 2009/0325691 A1 | 12/2009 | Loose et al. | |
| 2010/0087241 A1 | 4/2010 | Nguyen et al. | |
| 2010/0113174 A1 | 5/2010 | Ahern | |
| 2010/0160040 A1 * | 6/2010 | Ikeda | A63F 13/42 463/31 |
| 2010/0199229 A1 | 8/2010 | Kipman et al. | |
| 2010/0240433 A1 | 9/2010 | Walker et al. | |
| 2010/0304804 A1 | 12/2010 | Spivack et al. | |
| 2011/0006477 A1 | 1/2011 | Miller et al. | |
| 2011/0034248 A1 | 2/2011 | Grever | |
| 2011/0202152 A1 | 8/2011 | Barton | |
| 2012/0005591 A1 * | 1/2012 | Nurmi | G06Q 50/01 715/744 |
| 2012/0007713 A1 | 1/2012 | Nasiri et al. | |
| 2012/0034972 A1 | 2/2012 | Amaitis et al. | |
| 2012/0052942 A1 | 3/2012 | Esaki et al. | |
| 2012/0058824 A1 | 3/2012 | Raptis et al. | |
| 2012/0071244 A1 * | 3/2012 | Gillo | A63F 13/00 463/42 |
| 2012/0220372 A1 * | 8/2012 | Cheung | G06F 3/04886 463/37 |
| 2017/0001105 A1 | 1/2017 | Rom et al. | |
| 2018/0154251 A1 | 6/2018 | Rom et al. | |

OTHER PUBLICATIONS

Blizzard Entertainment, Inc., "Join Millions of Players Online and Discover the Most Epic Gaming Experiences . . . Ever!", http://us.battle.net/en/, website last visited Dec. 29, 2011; pp. 1-2.

Call of Duty, "Call of Duty—Elite", http://www.callofduty.com/elite, website last visited Dec. 29, 2011; 1 Page.

Electronic Sports League, "ESL: The eSports League", http://www.esl.eu/, website last visited Dec. 29, 2011; pp. 1-2.

HLTV.Org, "World Cyber Games 2011 Grand Finals", http://www.hltv.org/, website last visited Dec. 29, 2011; pp. 1-2.

* cited by examiner

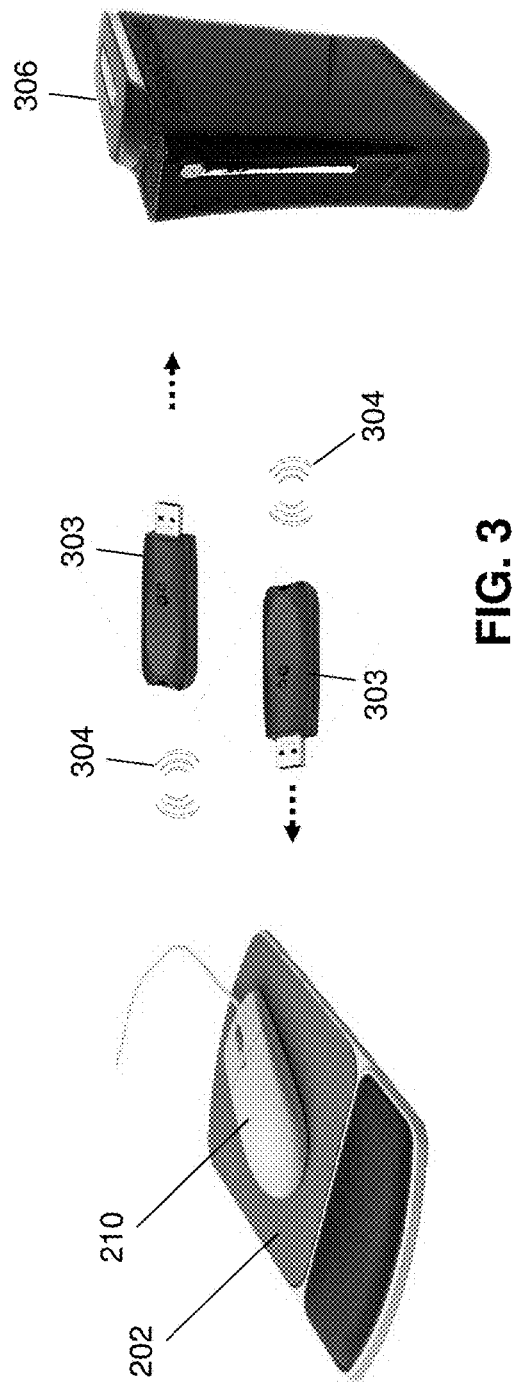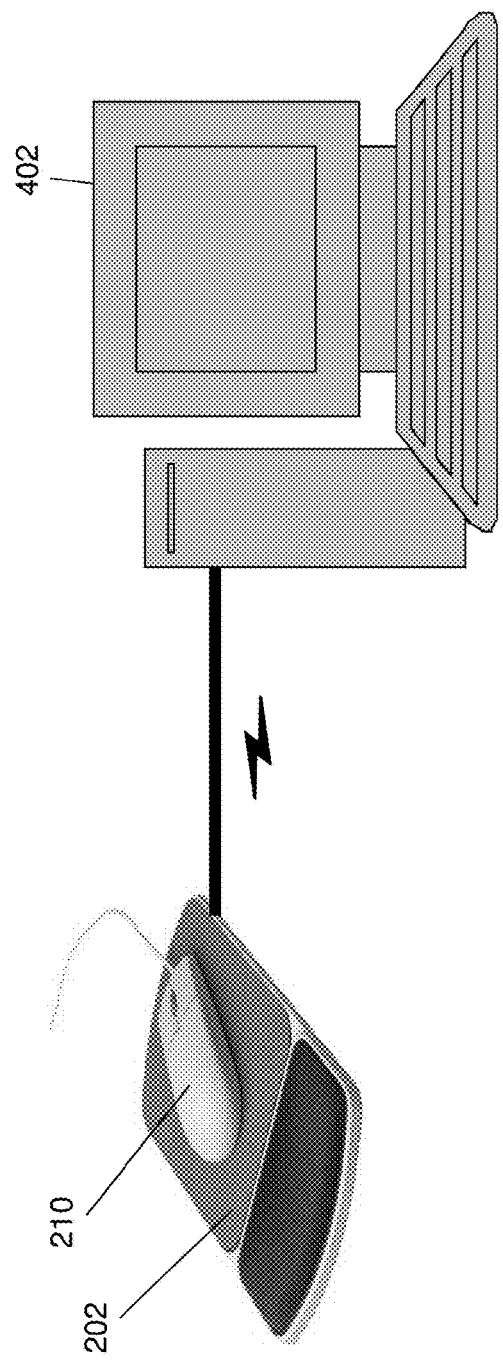

1100

| Gaming Application #1 | | | | | | Weapon Type | Gaming Application #2 | | | | | |
|---|---|---|---|---|---|---|---|---|---|---|---|---|
| Weapon Type | Misses | Non kill hits | Kill hits | Avg hit rate | Loss of life | Comm Rating | | Misses | Non kill hits | Kill hits | Avg hit rate | Loss of Life | Comm Rating |
| Sniper rifle | 3 | 7 | 4 | 29% | 5% | Above Avg | Sword | 45 | 15 | 12 | 89% | 35% | Above Avg |
| Machine gun | 36 | 12 | 18 | 33% | 27% | Above Avg | Knife | 12 | 5 | 6 | 26% | 45% | Above Avg |
| Hand gun | 5 | 2 | 3 | 30% | 90% | Avg | Bow & arrow | 5 | 7 | 6 | 33% | 3% | Excellent |

FIG. 14

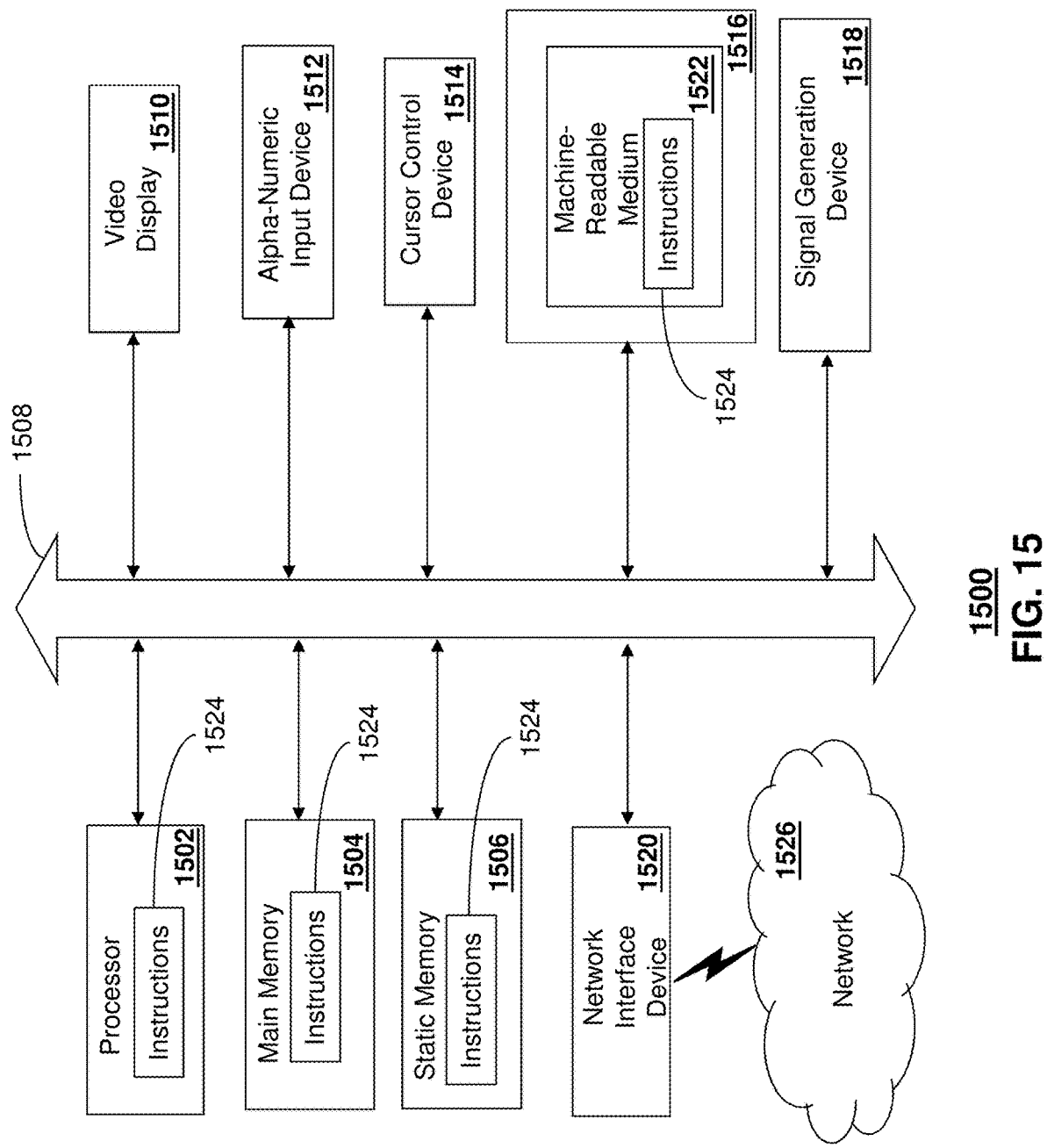

METHOD AND APPARATUS FOR DETERMINING PERFORMANCE OF A GAMER

CROSS-REFERENCE TO RELATED APPLICATIONS

This application is a Continuation of U.S. patent application Ser. No. 15/883,562, filed on Jan. 30, 2018, which is a Continuation of U.S. patent application Ser. No. 15/264,198 (now U.S. Pat. No. 9,914,049), filed on Mar. 13, 2018, which is a Continuation of U.S. patent application Ser. No. 13/340,663 (now U.S. Pat. No. 9,474,969), filed on Dec. 29, 2011. All sections of the aforementioned application(s) and patent(s) are incorporated herein by reference in their entirety.

FIELD OF THE DISCLOSURE

The present disclosure relates generally to a method and apparatus for determining performance of a gamer.

BACKGROUND

It is common today for gamers to utilize more than one gaming accessory. This is especially true of gamers who play Massively Multiplayer On-line (MMO) games in a team or individual configuration. Gamers can have at their disposal accessories such as a keyboard, a general purpose gaming pad, a mouse, a gaming console controller, a headset with a built-in microphone to communicate with other players, a joystick, a computer console, or other common gaming accessories.

A gamer can frequently use a combination of these accessories in one game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to other users.

BRIEF DESCRIPTION OF THE DRAWINGS

Reference will now be made to the accompanying drawings, which are not necessarily drawn to scale, and wherein:

FIGS. 3-4 depict illustrative embodiments for communicatively coupling the mouse pad of FIG. 2 to a computing device;

FIG. 14 depicts an illustrative embodiment of gaming results of two different gaming applications catalogued by the AMS application; and FIG. 15 depicts an illustrative diagrammatic representation of a machine in the form of a computer system within which a set of instructions, when executed, may cause the machine to perform any one or more of the methodologies disclosed herein.

DETAILED DESCRIPTION

Figure 1:
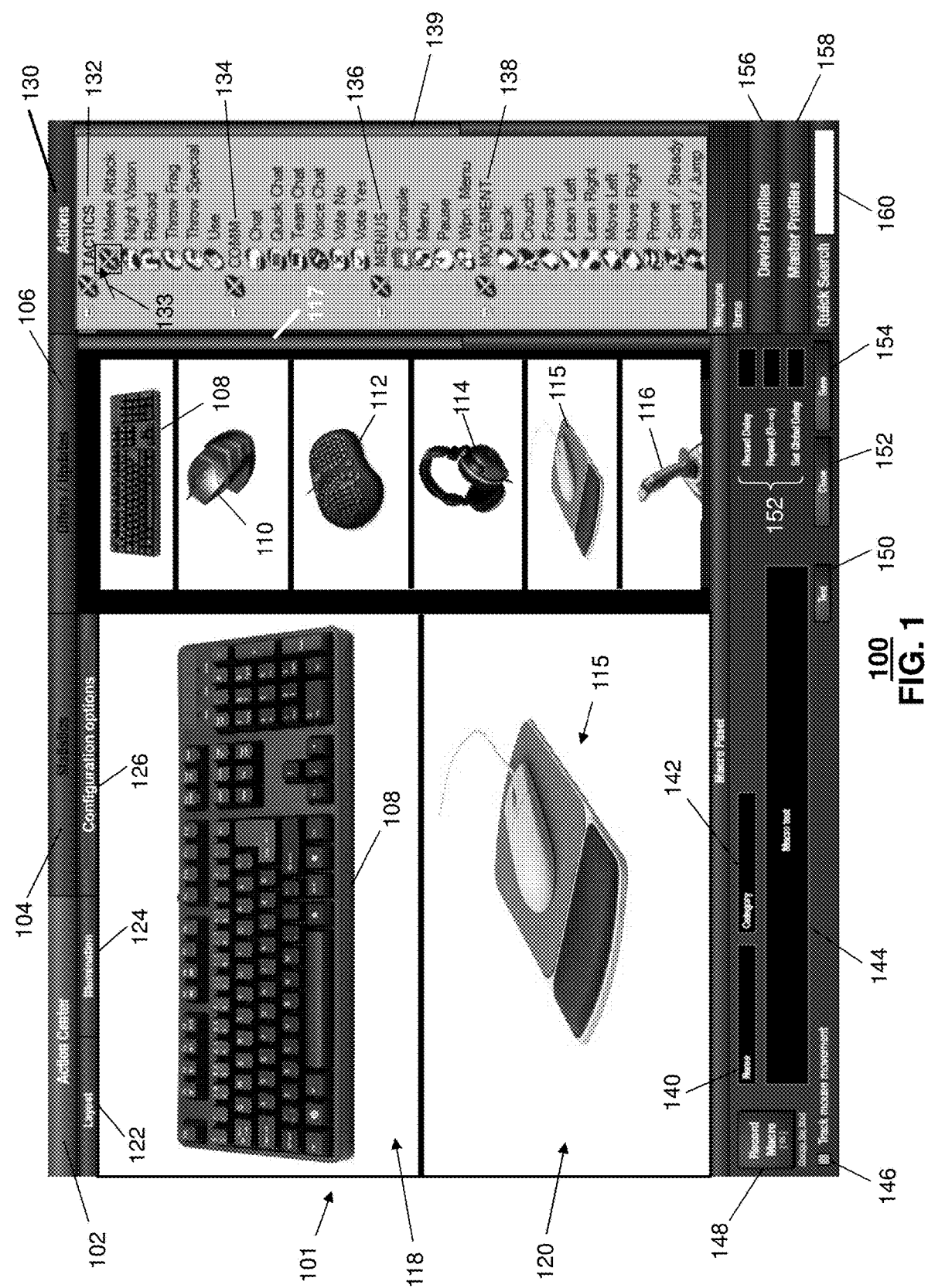
FIG. 1 depicts an illustrative embodiment of a Graphical User Interface (GUI) generated by an Accessory Management Software (AMS) application according to the present disclosure.

The subject disclosure describes, among other things, illustrative embodiments for collecting, processing, and cataloguing a gamer's performance and making assessments thereof. Other embodiments are contemplated by the subject disclosure.

One embodiment of the present disclosure can entail a method for detecting a plurality of stimulus signals generated by a gaming accessory device, identifying a plurality of substitute gaming stimulations associated with the plurality of stimulus signals, substituting the plurality of stimulus signals with the plurality of substitute gaming stimulations, incorporating in each of the plurality of substitute gaming stimulations a first unique identifier to generate a plurality of updated substitute gaming stimulations, transmitting the plurality of updated substitute gaming stimulations to a computing device executing a gaming application, and receiving from the computing device a plurality of game action results, where each of the plurality of gaming action results comprises the first unique identifier of a corresponding one of the plurality of updated substitute gaming stimulations.

One embodiment of the present disclosure can entail a computer-readable storage medium having computer instructions, which when executed by at least one processor, causes the at least one processor to detect a plurality of stimulus signals generated by a gaming accessory device, substitute the plurality of stimulus signals with a plurality of substitute gaming stimulations, incorporate in each of the plurality of substitute gaming stimulations a first unique identifier to generate a plurality of updated substitute gaming stimulations, submit the plurality of updated substitute gaming stimulations to a gaming application, and receiving from the gaming application a plurality of game action results, where each of the plurality of gaming action results comprises the first unique identifier of a corresponding one of the plurality of updated substitute gaming stimulations.

One embodiment of the present disclosure can entail a computing device, comprising a memory and a processor coupled to the memory. The memory can include computer instructions which when executed by the process, causes the processor to receive a plurality of substitute gaming stimulations, wherein the plurality of substitute gaming stimulations are a replacement of a plurality of stimulus signals generated by a gaming accessory device, and wherein each of the plurality of substitute gaming stimulations is accompanied with a first unique identifier, submit the plurality of substitute gaming stimulations to a gaming application, detect a plurality of gaming action results generated by the gaming application, generate an updated plurality of gaming action results by associating each of the plurality of gaming action results with the first unique identifier of a corresponding one of the plurality of substitute gaming stimulations, and submit the updated plurality of gaming action results for cataloguing a gamers performance.

One embodiment of the present disclosure can entail a method for detecting a plurality of stimulus signals generated by a gaming accessory device, identifying a plurality of substitute gaming stimulations associated with the plurality of stimulus signals, substituting the plurality of stimulus signals with the plurality of substitute gaming stimulations, submitting the plurality of substitute gaming stimulations to a gaming application, tracking a first order of the submitted plurality of substitute gaming stimulations, receiving from the gaming application a plurality of game action results, tracking a second order of the received plurality of game action results, and cataloguing the plurality of substitute gaming stimulations and the plurality of game action results according to a comparison of the first order of the submitted plurality of substitute gaming stimulations and the second order of the received plurality of game action results.

FIG. 1 depicts an illustrative embodiment of a Graphical User Interface (GUI) generated by an Accessory Management Software (AMS) application according to the present disclosure. The AMS application can operate in a computing device such as a desktop computer, a laptop computer, a server, a mainframe computer, a gaming console, a gaming accessory, or combinations or portions thereof. The AMS application can also operate in other computing devices with computing resources such as a cellular phone, a personal digital assistant, or a media player (such as an iPOD™). From these illustrations it is contemplated that the AMS application can operate in any device with suitable computing resources.

Figure 2:
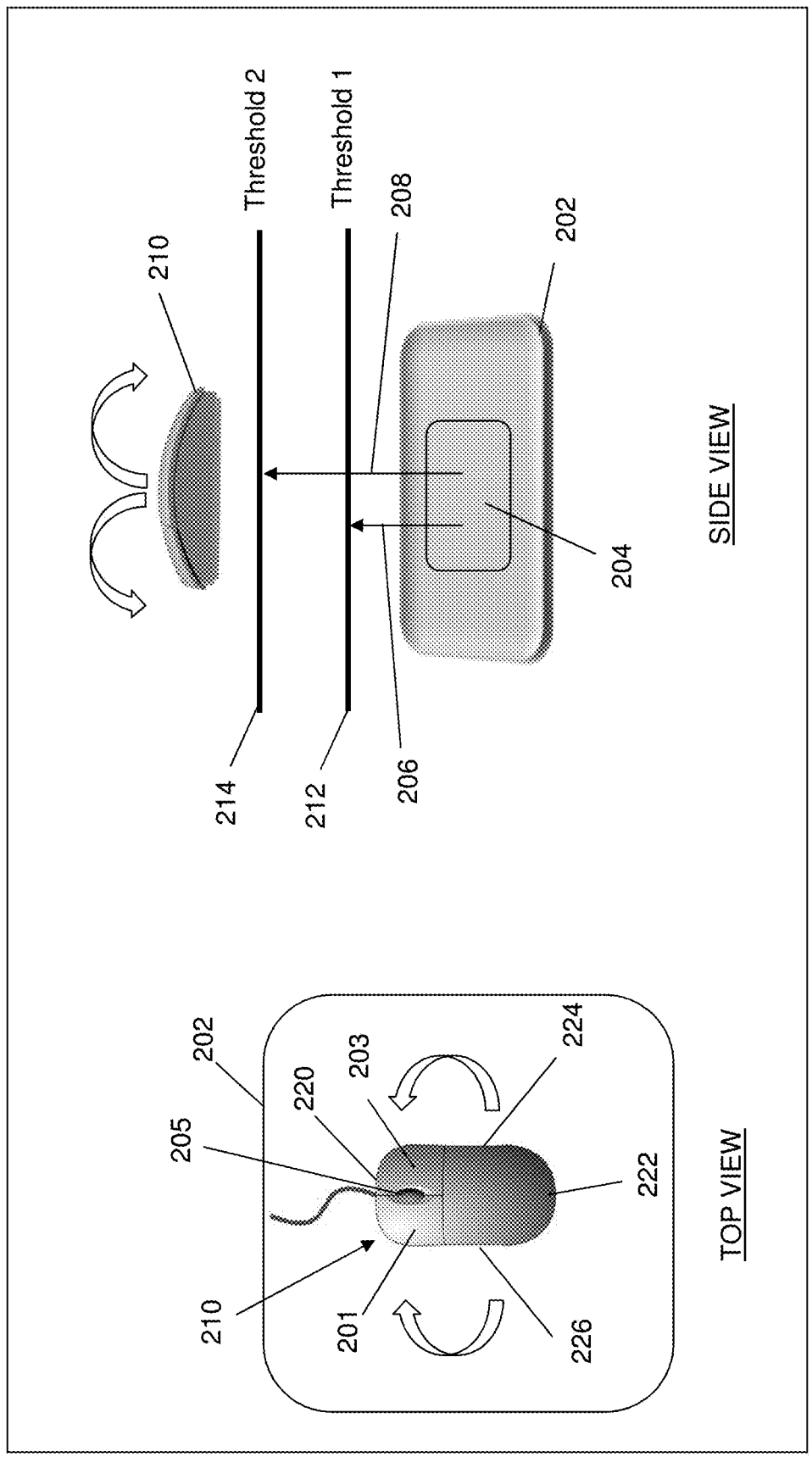
FIG. 2 depicts an embodiment of a mouse pad that tracks a relative displacement of a computer mouse from a top surface of the mouse pad.

FIG. 2 depicts a mouse pad 202 that can be coupled to a computer mouse 210. The mouse pad 202 can include a proximity sensor in the form of a electromagnetic sensor, a capacitive sensor, an inductive sensor, an image sensor, combinations thereof, or other suitable sensing devices capable of detecting a removal of the computer mouse 210 from a top surface 204 of the mouse pad 202. In one embodiment, the proximity sensor can measure a distance from the top surface 204 of the mouse pad 202 based on thresholds such as a first threshold 212 and second threshold 214. Each threshold can be used as a representative action to be applied to a game (e.g., causing a gaming avatar to move up one floor by lifting the mouse 210 greater than a first distance 206 but less than the second threshold 214, or causing the avatar to jump between roof tops when the mouse 210 is lifted greater than a second distance 208). The proximity sensor can cover all or a substantial portion of the top surface 204 of the mouse pad 202 to detect a three-dimensional displacement of the computer mouse 210 relative to the top surface 204 of the mouse pad 202. By covering a large surface area of the mouse pad 202, the proximity sensor can be operable to detect angular displacements of the computer mouse 210.

For example, the proximity sensor can be adapted to sense a displacement of the computer mouse 210 and provide sensing information that when processed can indicate that a front section 220 of the computer mouse 210 has been lifted from the top surface 204 of the mouse pad 202, while an edge of the rear section 222 remains on the top surface of the mouse pad 202. In another example, the proximity sensor can provide sensing information that indicates a rear section 222 of the computer mouse 210 has been lifted from the top surface 204 of the mouse pad 202, while a front section 220 of the mouse 210 remains on the top surface 204 of the mouse pad 202. In another embodiment, the proximity sensor can provide sensing information that indicates a right section 224 of the mouse 210 has been lifted from the top surface 204 of the mouse pad 202, while an edge of the left section 226 remains on the top surface 204 of the mouse pad 202. In yet another embodiment, the proximity sensor can provide sensing information that indicates a left section 226 of the mouse 210 has been lifted from the top surface 204 of the mouse pad 202, while an edge of the right section 224 remains on the top surface 204 of the mouse pad 202.

In another embodiment, the proximity sensor can provide sensing information that indicates the computer mouse 210 has been completely lifted from the top surface 204 of the mouse pad 202. In this instance, the sensing information can indicate an angular displacement of a bottom surface of the computer mouse 210 in three dimensions at various levels (e.g., threshold 1, threshold 2, etc.). In this embodiment the sensing information can indicate that the computer mouse 210 is banking left, banking right, tilting forward, tilting back, rotating counter-clockwise, rotating clockwise, and combinations thereof.

Based on the embodiments disclosed above, the proximity sensor can be adapted to detect two or three dimensional displacement data to determine the relative position of the mouse 210 to the top surface 204 of the mouse pad 202. This information can be supplied to the AMS application to enhance a user's gaming performance as will be described in more detail below.

FIG. 3 illustrates a number of embodiments for utilizing a wireless dongle 303 with the mouse pad 210 and a computing device 306 such as a gaming console (herein referred to as gaming console 306). In the illustration of FIG. 3, the USB portion of the dongle 303 can be physically engaged with either the mouse pad 302 or the gaming console 306. The dongle 210 in either of these configurations can communicate with the mouse pad 210 or the gaming console 306 by wireless means 304 (e.g., WiFi, Bluetooth, or ZigBee). Other embodiments of the dongle 303 are contemplated. For instance, the functions in whole or in part of the dongle 303 can be an integral part of the mouse pad 210 and/or the gaming console 304. In FIG. 4, the mouse pad 210 can alternatively be tethered to a computer 402 by cable (e.g., USB cable) to provide a means of communication less susceptible to electromagnetic interference or other sources of wireless interferences. Alternatively, the mouse pad 210 and a computer 402 can have an integrated wireless interface for wireless communications therebetween.

Figure 5:
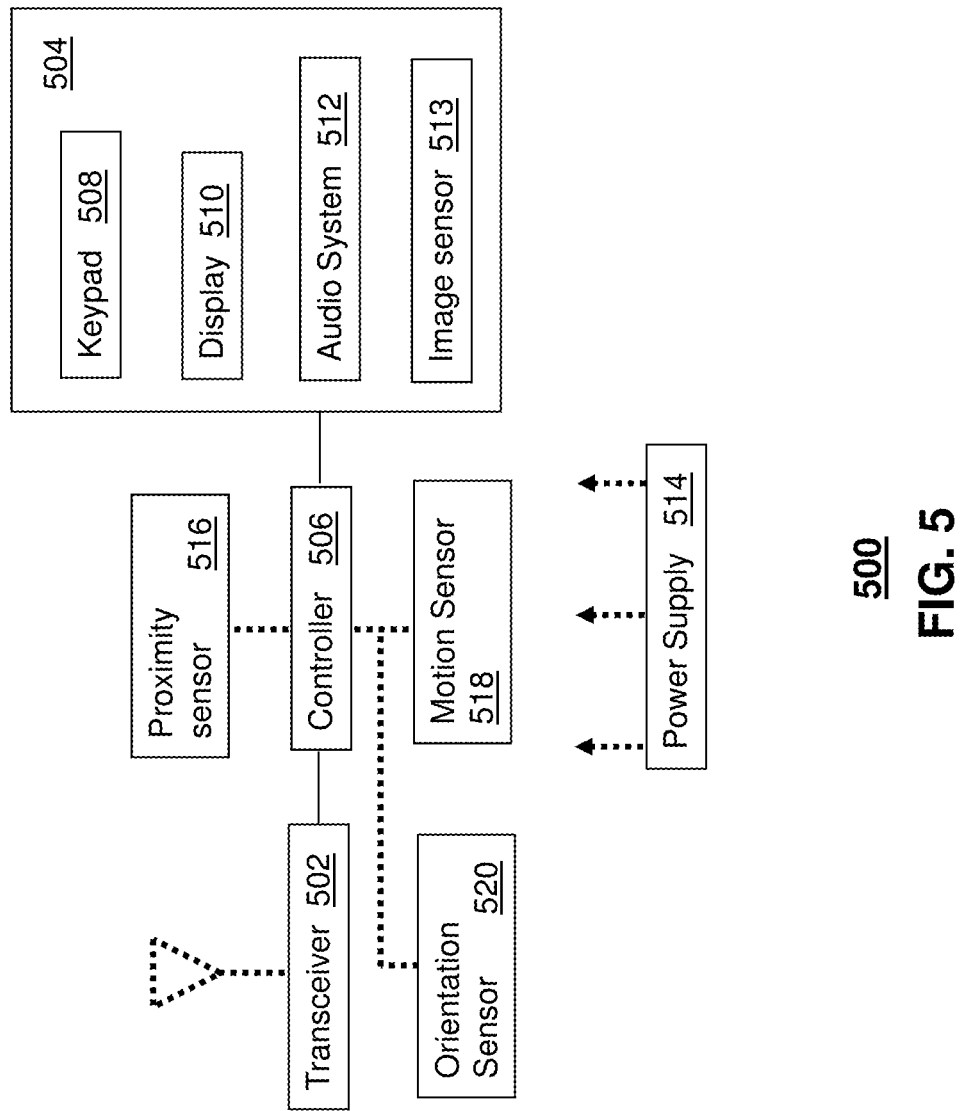
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIGS. 1-4. The communication device 500 can comprise a wireline and/or wireless transceiver 502 (herein transceiver 502), a user interface (UI) 504, a power supply 514, a proximity sensor 516, a motion sensor 518, an orientation sensor 520, and a controller 506 for managing operations thereof. The transceiver 502 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500.

In an embodiment where the display 510 is touch-sensitive, a portion or all of the keypad 508 can be presented by way of the display 510 with navigation features. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used control the manipulation of the GUI elements.

The UI 504 can also include an audio system 512 that utilizes common audio technology for conveying low volume audio (such as audio heard only in the proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable or rechargeable batteries, supply regulation technologies, and charging system technologies for supplying energy to the components of the communication device 500 to facilitate long-range or short-range portable applications. Alternatively, the charging system can utilize external power sources such as DC power supplied over a physical interface such as a USB port.

The proximity sensor 516 can utilize proximity sensing technology such as an electromagnetic sensor, a capacitive sensor, an inductive sensor, an image sensor or combinations thereof. The motion sensor 518 can utilize motion sensing technology such as an accelerometer, a gyroscope, or other suitable motion sensing technology to detect movement of the communication device 500 in three-dimensional space. The orientation sensor 520 can utilize orientation sensing technology such as a magnetometer to detect the orientation of the communication device 500 (North, South, West, East, combined orientations thereof in degrees, minutes, or other suitable orientation metrics).

The communication device 500 can use the transceiver 502 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 506 can utilize computing technologies such as a microprocessor, a digital signal processor (DSP), and/or a video processor with associated storage memory such as Flash, ROM, RAM, SRAM, DRAM or other storage technologies.

Other components not shown in FIG. 5 are contemplated by the present disclosure. For instance, the communication device 500 can include a reset button (not shown). The reset button can be used to reset the controller 506 of the communication device 500. In yet another embodiment, the communication device 500 can also include a factory default setting button positioned below a small hole in a housing assembly of the communication device 500 to force the communication device 500 to re-establish factory settings. In this embodiment, a user can use a protruding object such as a pen or paper clip tip to reach into the hole and depress the default setting button.

The communication device 500 as described herein can operate with more or less components described in FIG. 5. These variant embodiments are contemplated by the present disclosure. For example, the mouse pad 210 can be adapted to include at least a transmitter portion of the transceiver 502, the proximity sensor 516, the controller 506 and power supply 514 (which could be derived from a USB connection). In another embodiment, the mouse pad 210 can comprise the proximity sensor 516 and a display 510 of the UI 504. Other variants of the mouse 210 and mouse pad 210 are contemplated by the present disclosure.

Figure 8:
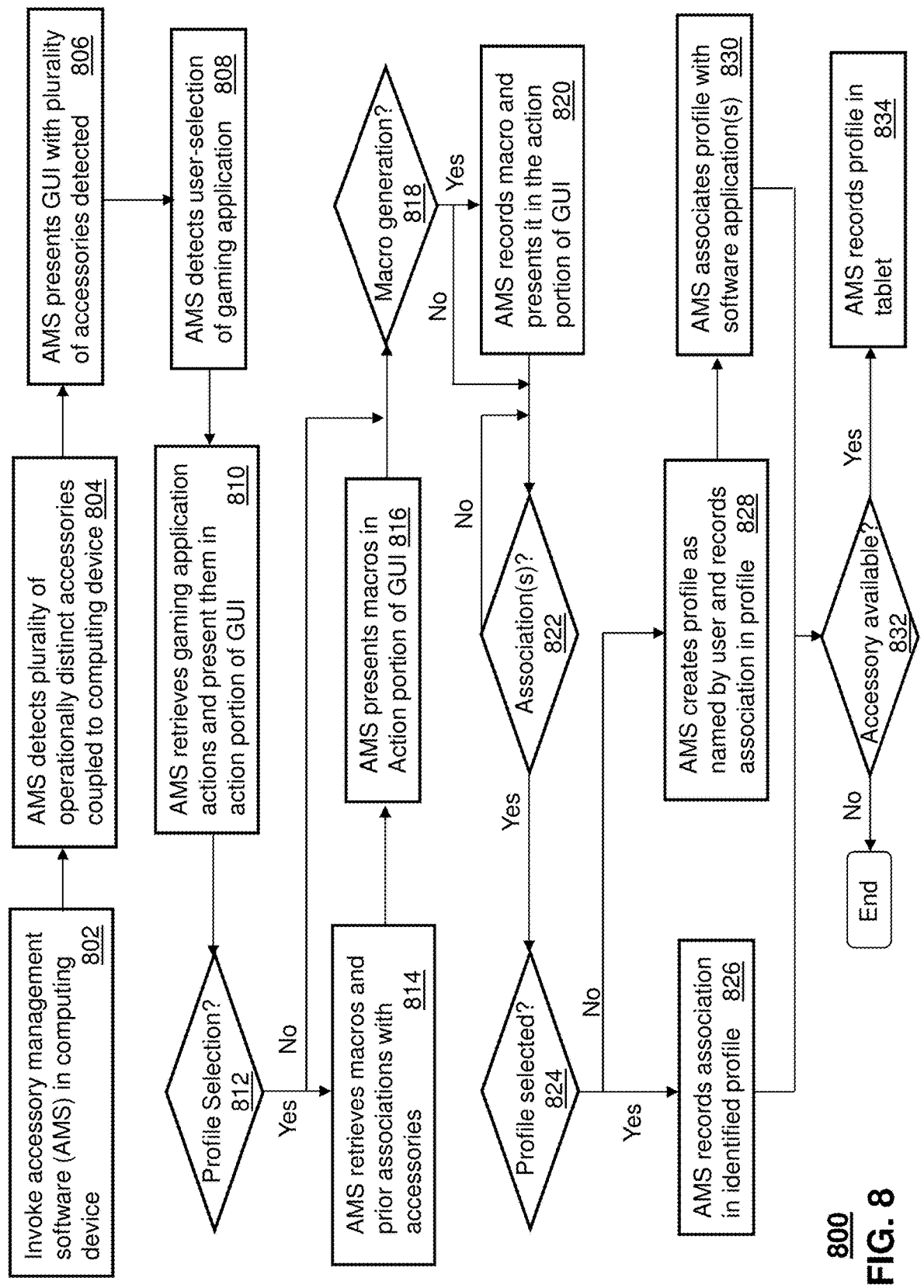
FIGS. 8-11 depict illustrative methods describing the operation of the AMS application.
Figure 9:
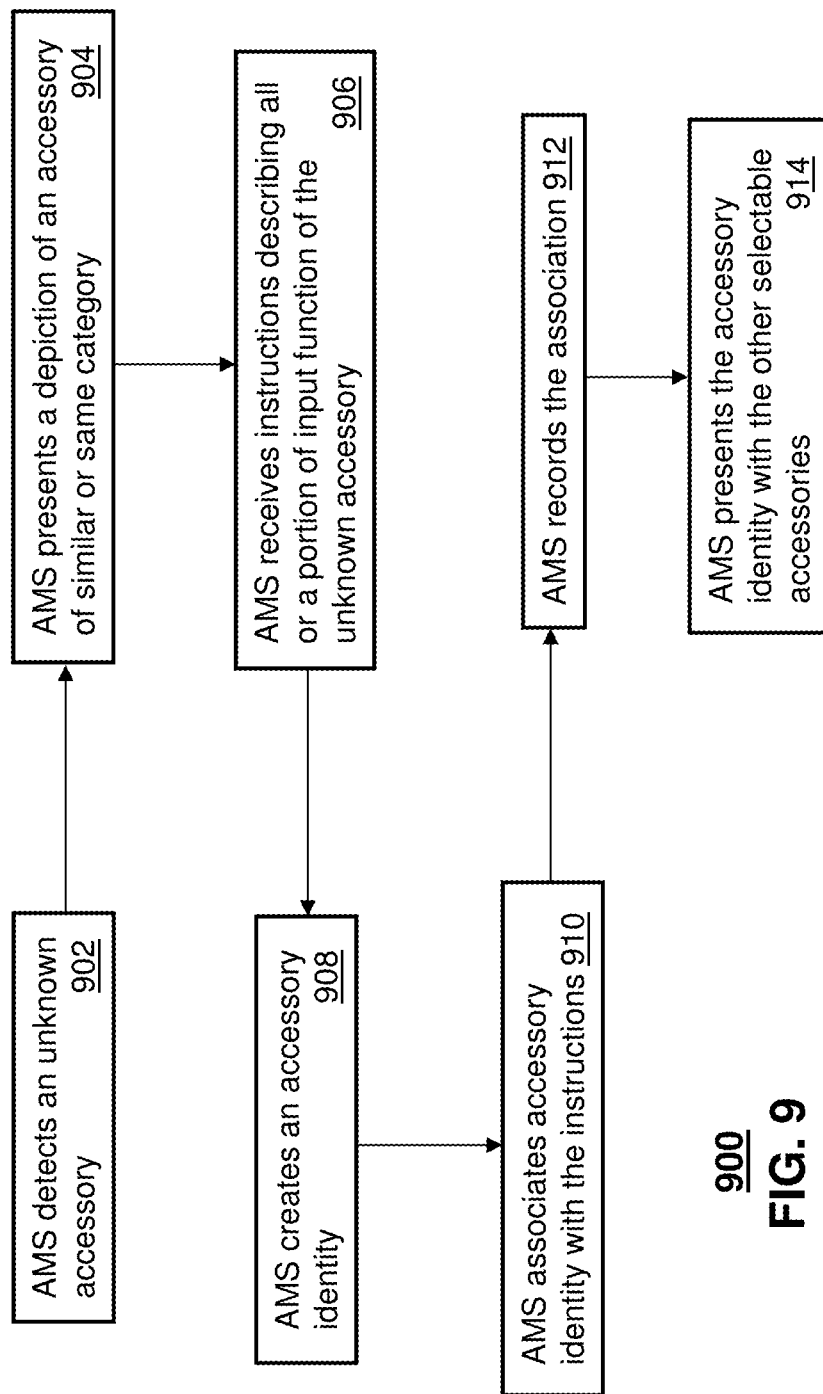
Figure 10:
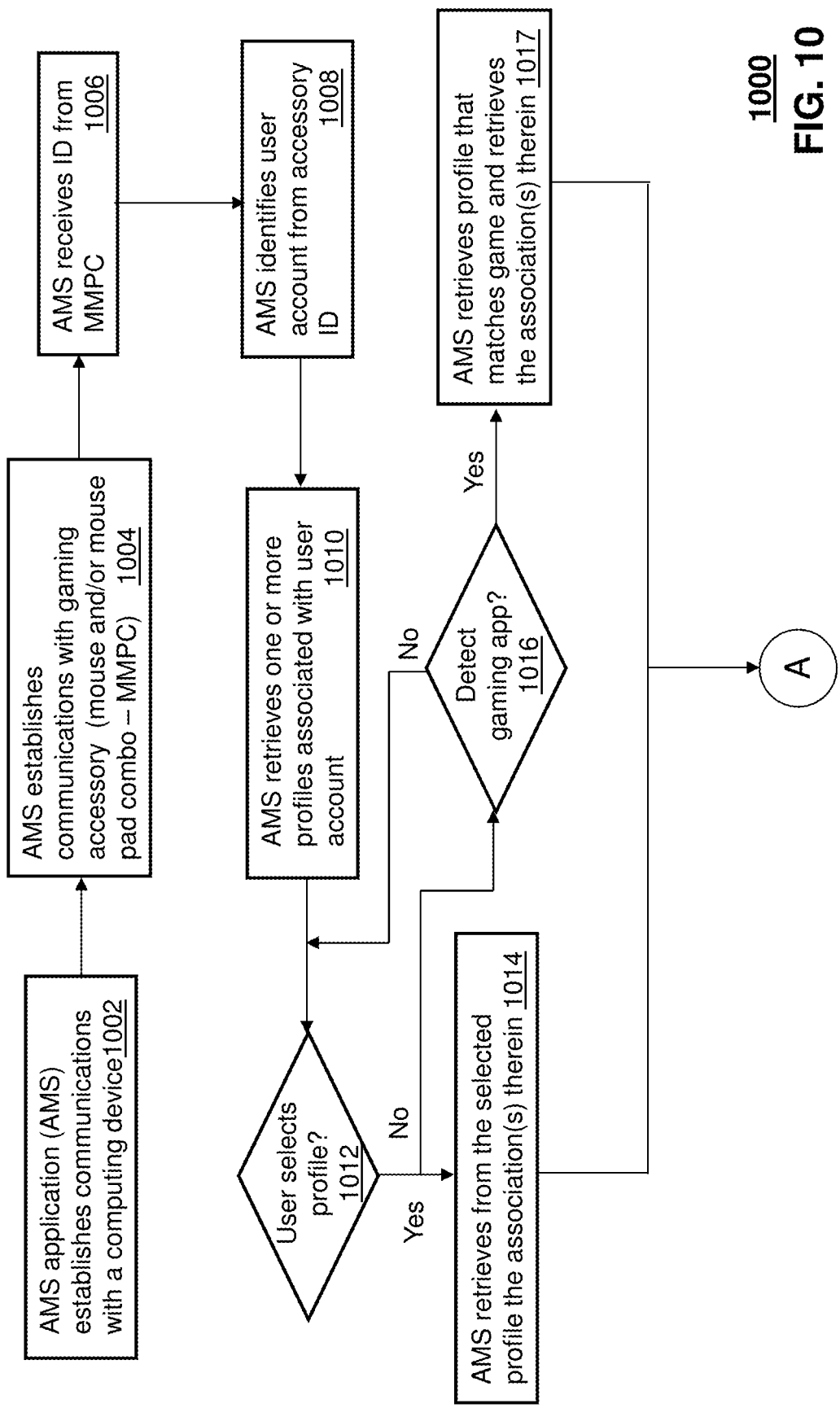

FIGS. 8-10 depict illustrative methods 800-1000 describing the operation of the AMS application and the apparatus 202. Method 800 can begin with step 802 in which the AMS application is invoked in a computing device. The computing device can be the gaming console 306 or computer 402 of FIGS. 3 and 4, or any other suitable computing device that can interact, execute a gaming application such as a video game, or otherwise present a visual rendition of a gaming application. The invocation step can result from a user selection of the AMS application from a menu or iconic symbol presented on a desktop of the computing device by an operating system (OS) managing operations thereof. In step 804, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device (or an integral part of the computing device) and which can control aspects of the OS and/or a software application operating in the computing device. An accessory can represent for example a keyboard, a touch screen display, a gaming pad, a mouse, a mouse with a proximity sensor, a mouse pad with a proximity sensor, a gaming console controller, a joystick, a microphone, or a headset with a microphone—just to mention a few. The keyboard and touch screen display represent accessories of a similar category since their operational parameters are alike.

A mouse and mouse pad with a proximity sensor (such as shown in FIG. 1), on the other hand, represent accessories having disparate operational parameters from the keyboard or touch screen display. For instance, the operational parameters of a keyboard generally consist of alphanumeric keys, control keys (e.g., Shift, Alt, Ctrl), and function keys while the operational parameters of a mouse and mouse pad with proximity sensor consist of two and three dimensional navigation data generated by a tracking device in the mouse and a proximity sensor in the mouse pad providing proximity sensing information, buttons on the mouse to invoke GUI selections, and settings of the mouse (e.g., counts or dots per inch, acceleration, scroll speed, jitter control, line straightening control, and so on). Such distinctions can be used to identify disparate categories of accessories.

In step 806, the AMS application presents a GUI 101 such as depicted in FIG. 1 with operationally distinct accessories such as the keyboard 108, and mouse and mouse pad combination 115. The GUI 101 presents the accessories 108-116 in a scrollable section 117. One or more accessories can be selected by a user with a common mouse pointer. In this illustration, the keyboard 108 and mouse and mouse pad combination 115 were selected for customization. Upon selecting the keyboard 108 and the mouse and mouse pad combination 115 in section 117, the AMS application presents the keyboard 108 and mouse and mouse pad combination 115 in split windows 118, 120, respectively, to assist the user during the customization process.

In step 808, the AMS application can be programmed to detect a user-selection of a particular software application such as a game. This step can be the result of the user entering in a Quick Search field 160 the name of a gaming application (e.g., World of Warcraft™ or WoW). Upon identifying a gaming application, the AMS application can retrieve in step 810 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a simple drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the mouse and mouse pad combination 115 to make an association with an input function of one of these accessories. Actions of one accessory can be associated with another accessory that is of a different category. For example, actions of game pad 112 can be associated with selectable options of the mouse and mouse pad combination 115.

Selectable options of the mouse and mouse pad combination 115 are shown in FIG. 2. As noted earlier, the mouse 210 can be placed on the mouse pad 202. While the mouse 210 is on the mouse pad 202, the mouse 210 can operate as it would normally. That is, with a tracking sensor (e.g., infrared sensor) the mouse 210 can detect movements on the mouse pad 202 and transmit these movement coordinates to a computing device such as the gaming console 306 in FIG. 3 or the computer 402 of FIG. 4. In one embodiment, a Melee Attack action can be associated by dragging this action to either the left button 201 or right button 203 of the mouse 210. Thus, when the selected button is pressed, the stimulus associated with the button depression of the mouse 210 can be substituted by the AMS application with the Melee Attack action. In one embodiment, the Melee Action can be associated with a combination of key button presses (e.g., simultaneous depression of the left and right buttons 201, 203, or a sequence of button depressions: two rapid left button depressions followed by a right button depression).

In one embodiment, the Melee Action can be associated with movement of the mouse 210 while on the mouse pad 202 such as, for example, rapid movement of the mouse 210 left to right repeatedly, forward and backward repeatedly, clockwise, or counterclockwise. In one embodiment, the Melee Attack can be associated with a lifting of the front side 220 of the mouse 210 from the mouse pad 202, a lifting of the left side 226 of the mouse 210 from the mouse pad 202, a lifting of the right side 224 of the mouse 210 from the mouse pad 202, or a lifting of the rear side 222 of the mouse 210 from the mouse pad 202. To facilitate one of these embodiments, the proximity sensor of the mouse pad 202 can detect these partial movements of the mouse 210 away from the top surface 204 of the mouse pad 202. The stimuli generated by any of these detectable movements away from the top surface 204 of the mouse pad 202 can be associated with the Melee Attack (or any other gaming function). The AMS application can thus substitute data generated by the proximity sensor with any gaming function of interest to the gamer.

In one embodiment, the complete removal of the mouse 210 from the mouse pad 202 can be associated with a spatial displacement. For example, the removal of the mouse 210 from the mouse pad 202 by a distance 206 exceeding the first threshold 212, but less than the second threshold 214, can be associated with moving up one level between floors of a building presented by a gaming application. The action to move between floors can be recorded in the AMS application as a macro. This macro can be associated with the detection of the mouse 210 when lifted above the first threshold 212 but below the second threshold 214. Each time the first threshold 212 is crossed, the AMS application can substitute the proximity data with a command or sequence of commands to move the gamer's avatar between floors.

In one embodiment, the AMS application can be adapted to make associations with two dimensional or three dimensional movements of the mouse 210 according to a gaming venue state. For example, suppose the player's avatar enters a fighter jet. In this gaming venue state, rolling of the thumbwheel 205 of the mouse 210 can be associated with controlling the throttle of the jet engines. For example, forward rolling of the thumbwheel wheel 205 can be associated with increasing the speed of the jet engines, while reverse rolling of the thumbwheel 205 can be associated with reducing the speed of the jet engines. Lifting the forward section 220 of the mouse 210 can be associated with moving the elevators of the jet to cause the jet to lift.

While the jet is in flight, removal of the mouse 210 from the mouse pad 202 can be associated with three dimensional navigation of the jet. For example, banking the mouse 210 to the right can be associated with banking the jet to the right and vice-versa. Tilting the mouse 210 forward can be associated with causing the jet to decline in altitude, while tilting the mouse 210 backwards can be associated with causing the jet to climb in altitude. Lowering the mouse 210 towards the mouse pad 202 can be associated with landing the jet. Moving the mouse clockwise or counterclockwise can be associated with controlling the jet's rudder. Three dimensional actions of the mouse 210 can be detected by the proximity sensor of the mouse pad 202 and submitted as data coordinates to the AMS application which can substitute these stimulations with navigation data that would have been otherwise transmitted by another accessory such as a joy stick.

In a gaming venue state where the gamer's avatar has entered a building, the thumbwheel 205 can be associated with moving the player forward or backward. The lifting of the mouse 210 above the first threshold 212 can be associated with a rapid movement of the avatar up one floor. The second threshold 214 can be associated with a rapid movement of the avatar down one floor—the opposite of the first threshold. Alternatively, the second threshold 214 could be associated with a different action such as jumping between buildings when the avatar is on the roof of a building.

Thus, the AMS application can associate stimuli of an accessory with predefined gaming actions, and adapt these associations based on a gaming venue state such as the ones described above. Accordingly, the associations made between stimuli supplied by an accessory such as the mouse pad 202 or the mouse 210 can be venue state dependent. The gaming venue state can be a description of a gaming state (e.g., gaming controls for a tank), captured images of the gaming venue state (e.g., one or more still images of a tank, or a video of an avatar entering a tank), and/or application programming instructions (API) messages which can be received from the gaming application to enable the AMS application to identify the occurrence of a particular gaming venue state.

With this in mind, attention is directed to step 812 where the AMS application can respond to a user selection of a profile. A profile can be a device profile or master profile invoked by selecting GUI button 156 or 158, each of which can identify the association of gaming actions with input functions of one or more accessories. If a profile selection is detected in step 812, the AMS application can retrieve in step 814 macro(s) and/or prior associations of actions with the accessories as defined by the profile. The actions and/or macros defined in the profile can also be presented in step 816 by the AMS application in the actions column 130 of the GUI 101 to modify existing associations or create new associations.

In step 818, the AMS application can also respond to a user selection to create a macro. A macro in the present context can mean any actionable command which can be recorded by the AMS application. An actionable command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool) to be initiated by an OS.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a mouse or joystick, recordable selections of buttons on a keyboard, a mouse, or a mouse pad, and so on. Macros can also be combinations of the above illustrations. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, two or three dimensional movements of the mouse 210 relative to the mouse pad 202, etc.) and/or by manual entry in field 144 (e.g., typing the name and location of a software application to be initiated by an OS, such as an instant messaging application). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 820. The recording step can be combined with a step for adding the macro to the associable items Actions column 130, thereby providing the user the means to associate the macro with input functions of the accessories (e.g., one or more keys of the keyboard 108, buttons of the mouse 210, two or three dimensional movements of the mouse 210 relative to the mouse pad 202).

In step 822, the AMS application can respond to drag and drop associations of actions and input functions of the keyboard 108 and selectable GUI elements of the mouse 210 and mouse pad combination 115. Associations can also be made based on the two or three dimensional movements of the mouse 210. In this embodiment, the movements can be associated with navigation movements generated by a joy stick 116. Alternatively, the AMS application can be adapted to perform mathematical transcoding of three dimensional data generated by the mouse pad 202 to three dimensional data generated by a navigation device such as the joy stick 116. Mathematical transcoding can be performed by modeling the stimuli of a particular navigation device with two or three dimensional navigation stimuli generated by the mouse pad 202. If user input indicates that a user is performing an association, the AMS application can proceed to step 824 where it can determine if a profile has been identified in step 812 to record the association(s) detected. If a profile has been identified, the associations are recorded/stored in the profile in step 826. If a profile has not been identified in step 812, the AMS application can create a profile in step 828 for recording the detected associations. In the same step, the user can name the newly created profile as desired. The newly created profile can also be associated with one or more gaming software applications in step 830 for future reference. It is noted that in the case of the mouse and mouse pad combination 115, the AMS application can record in a profile in step 826 associations based on gaming venue states. Accordingly, the same stimuli generated by the mouse pad 202 or mouse 210 can result in different substitutions based on the gaming venue state detected by the AMS application.

The AMS application can be adapted to utilize image processing technology to detect a gaming venue state according to pre-stored images or video clips stored in the profile. For example, the AMS application can use image processing technology to identify an avatar of a gamer and track what the avatar does as directed by the gamer. For example, if the avatar enters a tank, the image processing technology of the AMS application can detect a gaming venue state associated with the use of a tank, and thereby identify associations between accessory stimuli and gaming actions (e.g., associations between gaming actions and button depressions of the mouse 210, associations between gaming actions and two or three dimensional movements of the mouse 210 relative to the mouse pad 202, and so on).

Referring back to step 826, once the associations have been recorded in a profile, the AMS application can determine in step 832 whether the accessories shown illustratively in FIGS. 2-4 are available for programming. If the AMS application detects that the accessories (mouse 210 and mouse pad 202) are communicatively coupled to a computing device from which the AMS application is operating (e.g., gaming console 306 or computer 402), the AMS application can proceed to step 834 of FIG. 8 where it submits the profile and its contents for storage in one of the accessories (e.g., the mouse 210 or mouse pad 202 in FIGS. 3-4) or the dongle 303. In this embodiment, the mouse 210, mouse pad 202, dongle 303, or combinations thereof can perform stimuli substitutions according to the associations recorded by the AMS application in the profile. Alternatively, the AMS application can store the profile in the computing device (306 or 402) and perform substitutions of stimuli supplied by the mouse 210 and mouse pad 202 according to stimuli to gaming actions associations recorded in the profile by the AMS application.

The GUI 101 of FIG. 1 presented by the AMS application can have other functions. For example, the GUI 101 can provide options for layout of the accessory selected (button 122), how the keyboard is illuminated when associations between input functions and actions are made (button 134), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from raw stimulation information captured by the AMS application as will be described below. Selecting button 106 can also cause the AMS application to adapt the GUI 101 to present promotional offers and software updates.

It should be noted that the steps of method 800 in whole or in part can be repeated until a desirable pattern of associations of actions to stimulus signals or stimulus data generated by the selected accessories has been accomplished. The stimulus signals or stimulus data can be generated as described above from manipulations of the accessory (e.g., button depressions or other forms of accessory usage such as two or three dimensional movement of the mouse 210 relative to the mouse pad 202 as shown in FIG. 2). The stimulus signals or stimulus data generated by an accessory can be associated with gaming actions in the form of other stimulus signals or stimulus data recognizable by the gaming application (e.g., video game). It would be apparent to an artisan with ordinary skill in the art that there can be numerous other approaches to accomplish similar results. These undisclosed approaches are contemplated by the present disclosure.

FIG. 9 depicts a method 900 in which the AMS application can be programmed to recognize unknown accessories so that method 800 can be applied to new accessories. Method 900 can begin with step 902 in which the AMS application detects an unknown accessory such as a new keyboard, tablet, mouse pad with proximity sensor, or other type of accessory from an unknown vendor by way of a communicative coupling to a computing device from which the AMS application operates. Assuming in this illustration the unknown accessory is a keyboard, the AMS application in this instance can receive identity information from the keyboard. The identity can be used to search for the keyboard from a local or remote database. Upon detecting an unknown accessory, the AMS application in step 904 can present a depiction of an accessory of similar or same category in response to a user providing direction as to the type of accessory (by selecting for example a drop-down menu). Alternatively, or in combination with the user instructions, the AMS application can determine from the identity information received from the unknown accessory an accessory type.

In step 906 the AMS application can receive instructions describing all or a portion of the input functions of the unknown accessory. These instructions can come from a user who defines each input function individually or responds to inquiries provided by the AMS application, or from a remote database that describes the features of the accessory. The AMS application can for example make an assumption as to the keyboard layout and highlight each key with a proposed function which the user can verify or modify. Once the AMS application has been provided instructions in step 906, the AMS application can create an accessory identity in step 908 which can be defined by the user. In steps 910 and 912, the AMS application can associate and record the accessory instructions with the identity for future recognition of the accessory. In step 914, the AMS application can present a depiction of the new accessory with its identity along with the other selectable accessories in section 117 of FIG. 1.

Method 900 can provide a means for universal detection and identification of any accessory which can be used to control or manage software applications operating in a computing device.

FIG. 10 depicts a method 1000 for illustrating the operations of the AMS application for either of the configuration shown in FIGS. 3-4. In the configurations of FIGS. 3-4, the AMS application can be operating in whole or in part from the mouse 210, the mouse pad 202, the computer 402 (or gaming console 306), or combinations thereof. For illustration purposes, it is assumed the AMS application operates from the computer 402. Method 1000 can begin with the AMS application establishing communications in steps 1002 and 1004 with the computer 402 and a gaming accessory such as the mouse 210 and mouse pad 202, a keyboard 108, and a headset 114 such as shown in FIGS. 1 and 2. These steps can represent for example a user starting the AMS application from the computer 402 and/or the user inserting at a USB port of the computer 402 a connector of a USB cable tethered to the mouse 210 and another USB cable tethered to the mouse pad 202, which invokes the AMS application. In step 1006, the mouse 210 and mouse pad 202, keyboard 108, and/or headset 114 can in turn provide the AMS application one or more accessory ID's. With the accessory ID's, the AMS application can identify in step 1008 a user account associated with the mouse 210 and mouse pad 202. In step 1010, the AMS application can retrieve one or more profiles associated with the user account.

In step 1012, the user can be presented by way of a display coupled to the computer 402 profiles available to the user to choose from. If the user makes a selection, the AMS application proceeds to step 1014 where it retrieves from the selected profiles the association(s) stored therein. If a selection is not made, the AMS application can proceed to step 1016 where it can determine whether a software gaming application (e.g., video game) is operating from the computer 402 or whether the computer 402 is communicating with the software gaming application by way of a remote system communicatively coupled to the computer 402 (e.g., on-line gaming servers presenting, for example, World of Warcraft™). If a gaming software application is detected, the AMS application proceeds to step 1017 where it retrieves a profile that matches the gaming application detected and the association(s) contained in the profile. In the present context, association(s) can represent accessory stimulations, navigation, speech, the invocation of other software applications, or macros. The accessory stimulations can be stimulations that are generated by the mouse 210 and mouse pad 202 being used, as well as stimulations from other accessories (e.g., keyboard 108, headset 114), or combinations thereof.

Figure 11:
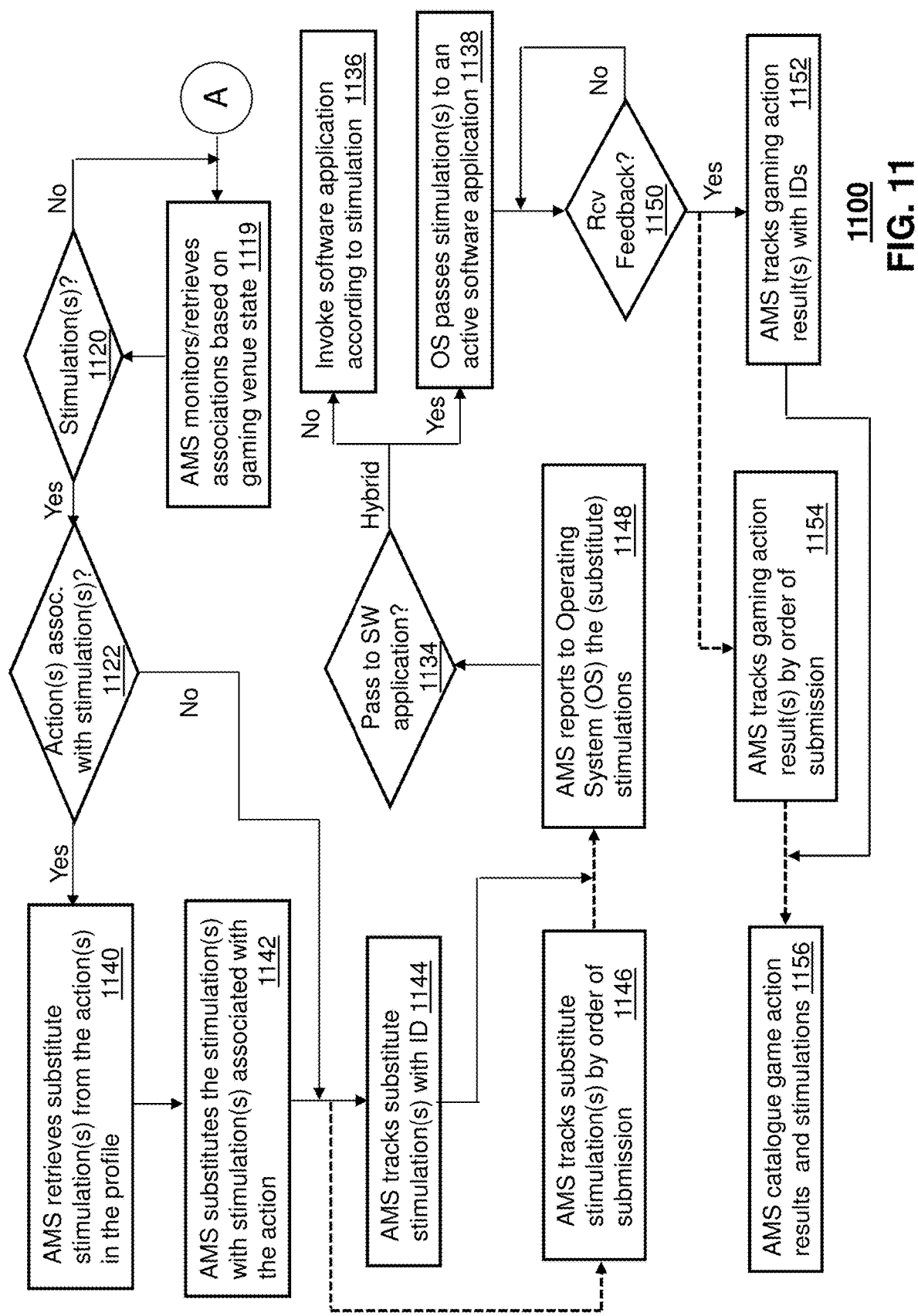

Once a profile and its contents have been retrieved in either of steps 1014 or step 1017, the AMS application can proceed to step 1119 of FIG. 11 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen, receiving an API instruction from the gaming application, or by performing image processing on the video presentation generated by the gaming application. For example, the AMS application can detect that the gamer has directed an avatar to enter a tank. The AMS application can retrieve in step 1119 associations for the mouse 210 and mouse pad 202 for controlling the tank.

Moving the mouse 210 forward, backwards, or sideways in two dimensions can control the tanks movement. Similarly, rotating the mouse 210 can control the rotation of the tank. Tilting the mouse 210 forward which lifts the rear portion 222 of the mouse 210 can cause the proximity sensor of the mouse pad 202 to provide proximity data to the AMS application which is substituted with an action to cause the tank to move forward. The profile retrieved by the AMS application can indicate that the greater the forward tilt of the mouse 210, the greater the speed of the tank should be moving forward. Similarly, a rear tilt can generate proximity data that is substituted with a reverse motion and/or braking of the forward motion to stop or slow down the tank. A three dimensional lift of the mouse can cause the tank to steer according to the three dimensional proximity data provided by the mouse pad 202. For example, a combination of a forward tilt and right bank of the mouse 210 can be substituted by the AMS application to cause an increase in forward speed of the tank with a turn to the right determined by the AMS application according to a degree of banking of the mouse 210 to the right. In the above embodiment, the three dimensional proximity data allows a gamer to control any directional vector of the tank including speed and acceleration.

In another illustration, the AMS application can detect a new gaming venue state as a result of the gamer directing the avatar to leave the tank and travel on foot. Once again the AMS application retrieves in step 1119 associations related to the gaming venue state. In this embodiment, selection of buttons of the mouse 210 can be associated with weaponry selection, firing, reloading and so on. The movement of the mouse 210 in two dimensions can control the direction of the avatar. Similarly, three dimensional movement of the mouse 210 can be detected by the mouse pad 202 and transmitted to the AMS application as three dimensional proximity data which can control any directional vector of the avatar including speed and acceleration similar to how the tank was controlled.

Thus once the gaming venue state is detected in step 1119, the AMS application retrieves the associations related to the venue state and performs substitutions of stimuli generated by the mouse 210, mouse pad 202, keyboard 108, and/or speech commands generated by the headset 114. The AMS application can then proceed to monitor in step 1120 stimulations generated by the accessories coupled to the computer 402. The stimulations can be generated by the gamer by manipulating the mouse 210, mouse pad 202, keyboard 108, and/or by speech commands detected by the headset 114.

If a simulation is detected at step 1120, the AMS application can determine in step 1122 whether to pass the detected stimulation(s) to an Operating System (OS) of the computer 402 without substitutions in steps 1140-1148. This determination can be made by comparing the detected stimulation(s) to triggers associated with one or more actions in the profile. If the detected stimulation(s) match the stimulations identified as triggers, then the AMS application proceeds to step 1140 where it retrieves substitute stimulation(s) from the triggered action(s) in the profile. In step 1142, the AMS application can substitute the detected stimulation(s) with the substitute stimulations in the profile. In one embodiment, the AMS application can track in step 1144 the substitute stimulations by updating these stimulations with a unique identifier such as a globally unique identifier (GUID). In this embodiment, the AMS application can also add a time stamp to each substitute stimulation representative of when the substitution was performed.

In another embodiment, the AMS application can track each substitute stimulation according to their order of submission to the gaming application. For instance, sequence numbers can be generated for the substitute stimulations to track the order in which they were submitted to the gaming application. In this latter embodiment, the substitute stimulations do not need to be updated with sequence numbers or identifiers so long as the order of gaming action results submitted by the gaming application to the AMS application remain in the same order as the substitute stimulations were originally submitted. For example, if a first stimulation sent to the gaming application is a command to shoot, and a second stimulation sent to the gaming application is a command to duck, then so long as the gaming application provides first a game action result for shooting, followed by a game action result for ducking, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results. Once the stimulations received in step 1120 have been substituted with other stimulations in step 1142, and the AMS application has chosen a proper tracking methodology, the AMS application can proceed to step 1148 and report the substitute stimulations to the OS of the computer 402.

Referring back to step 1122, if the detected stimulation(s) do not match the stimulations identified as triggers in the profile associated with the game, the AMS application proceeds to one of steps 1144 or 1146 in order to track the stimulations of the accessory. Once the AMS application has performed the necessary steps to track the stimulation as originally generated by the accessory, the AMS application proceeds to step 1148 where it transmits the detected stimulation to the OS of the computer 402 with or without tracking information as previously described.

In step 1134, the OS determines whether to invoke in step 1136 a software application identified in the stimulation(s) (e.g., gamer says "turn on team chat", which invokes a chat application), whether forward the received stimulations to the gaming software application in step 1138, or combinations thereof. Contemporaneous to the embodiments described above, the AMS application can monitor in step 1150 for game action results supplied by the gaming application via a defined API. The game action results can be messages sent by the gaming application by way of the API of the gaming application to inform the AMS application what has happened as a result of the stimulation sent in step 1138. For instance, suppose the stimulation sent to the gaming application in step 1138 is a command to shoot a pistol. The gaming application can determine that the shot fired resulted in a miss of a target. The gaming application can respond with a message which is submitted by way of the API to the AMS application that indicates the shot fired resulted in a miss. If IDs such as GUIDs were sent with each stimulation, the gaming application can submit game action results with their corresponding GUID.

For example, if the command to shoot included the ID "1234", then the game action result indicating a miss will include the ID "1234", which the AMS application can use in step 1152 to correlate stimulations with game action results. If on other hand, the order of game action results can be maintained consistent with the order of the stimulations, then the AMS application can correlate in step 1154 stimulations with game action results by the order in which stimulation were submitted and the order in which game action results were received. In step 1156, the AMS application can catalogue stimulations and game action results accordingly.

Figure 12:
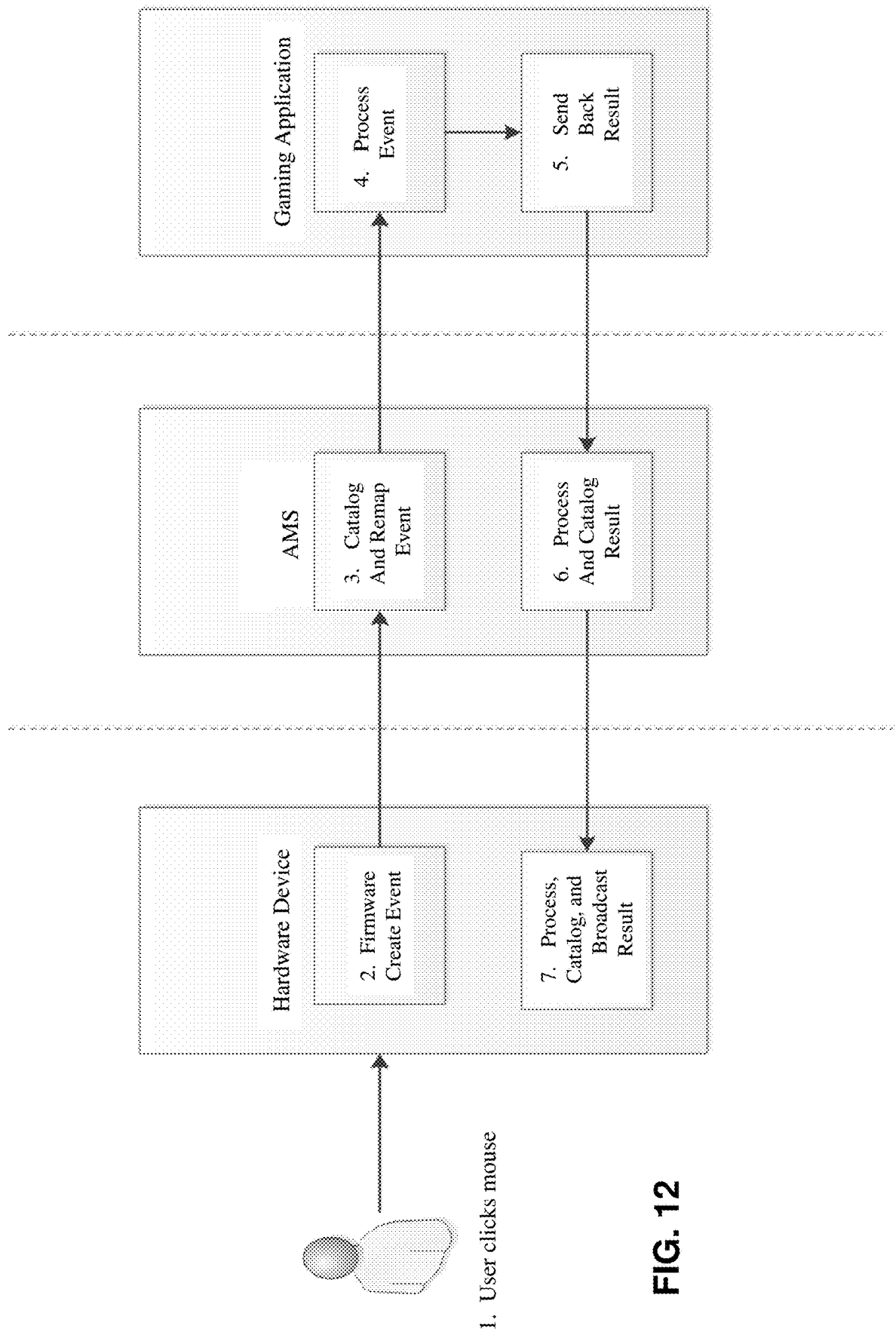
FIG. 12 depicts an illustrative embodiment of a system operating at least in part according to the methods of FIGS. 8-11.
Figure 13:
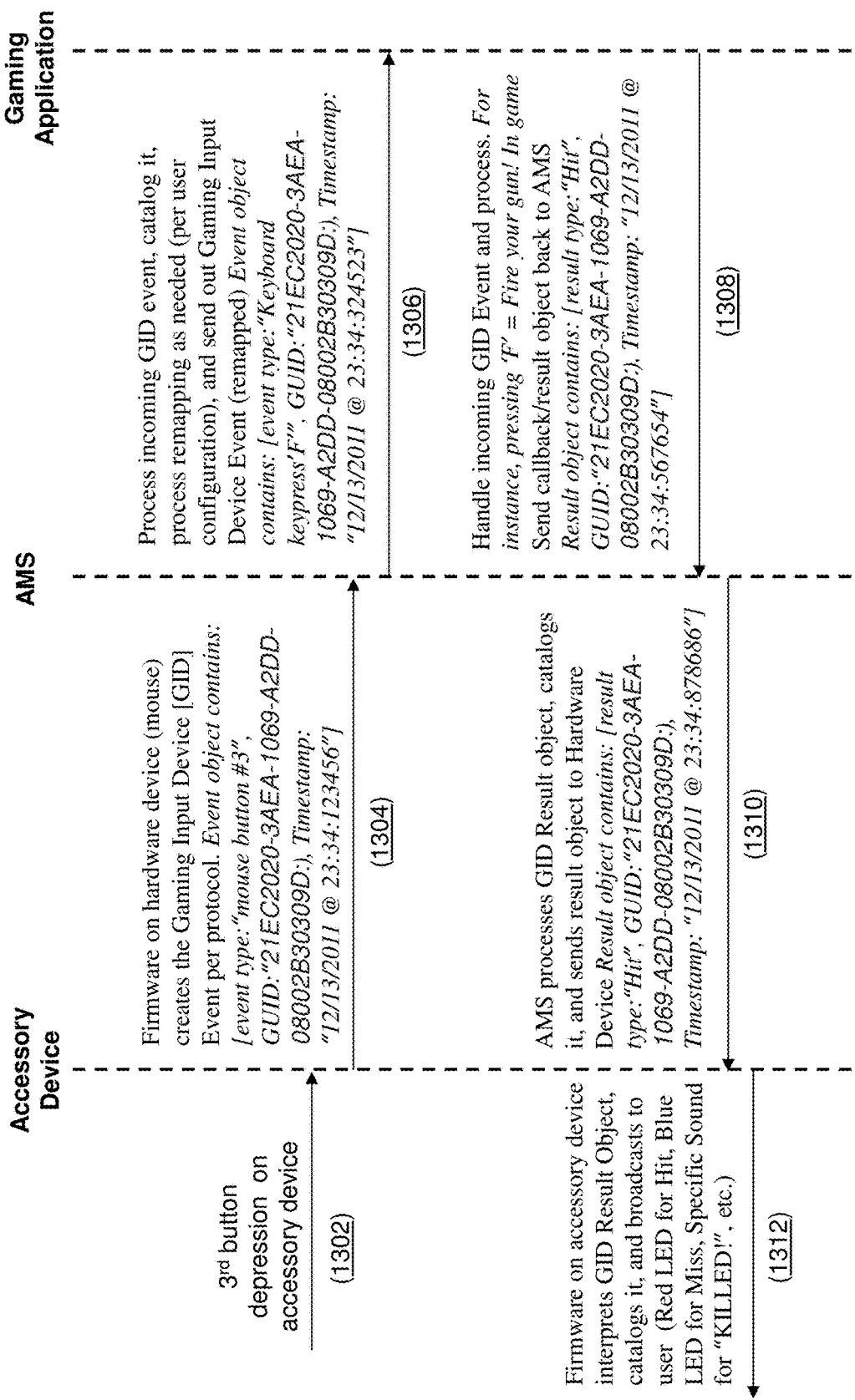
FIG. 13 depicts an illustrative embodiment of a communication flow diagram utilized by the system of FIG. 12.

FIGS. 12-13 illustrate embodiments of a system with a corresponding communication flow diagram. In this illustration a user clicks a mouse button as shown in FIG. 12. The mouse accessory device can include firmware, which creates an event as depicted by event 2 in FIG. 12. The mouse click and the event creation are depicted in FIG. 13 as steps 1302 and 1304. In step 1304, the firmware of the mouse accessory can, for example, generate an event type "mouse button #3", and a unique GUID with a time stamp which is submitted to the AMS application. Referring back to FIG. 12, the AMS application catalogues event 3, and if a substitute stimulation has been predefined, remaps the event according to the substitution. The remapped event is then transmitted to the gaming application at event 4. Event 3 of FIG. 12 is depicted as step 1306 in FIG. 13. In this illustration, the AMS application substitutes the mouse button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 1308 in FIG. 13. In this step, the gaming application processes "F" as an action to fire the gamer's gun, and then determines from the action the result from logistical gaming results generated by the gaming application. In the present illustration, it is assumed the action resulted in a hit. The gaming application submits to the AMS application the result type "Hit" with a new time stamp, while utilizing the same GUID for tracking purposes. At step 1310, the AMS application correlates the stimulation "mouse button #3 (and/or the substitute stimulation keyboard "F") to the game result "Hit" and catalogues them in memory. The AMS application then submits to the accessory (e.g., mouse) in step 1310 the game action results "Hit" with the same GUID, and a new time stamp indicating when the result was received. Upon receiving the message from the AMS application, the accessory in step 1312 process the "Hit" by asserting a red LED on the accessory (mouse) to indicate a hit. Other notification notices can be used such as another color for the LED to indicate misses, a specific sound for a hit, or kill, a vibration or other suitable technique for notifying the gamer of the game action result.

Figure 6:
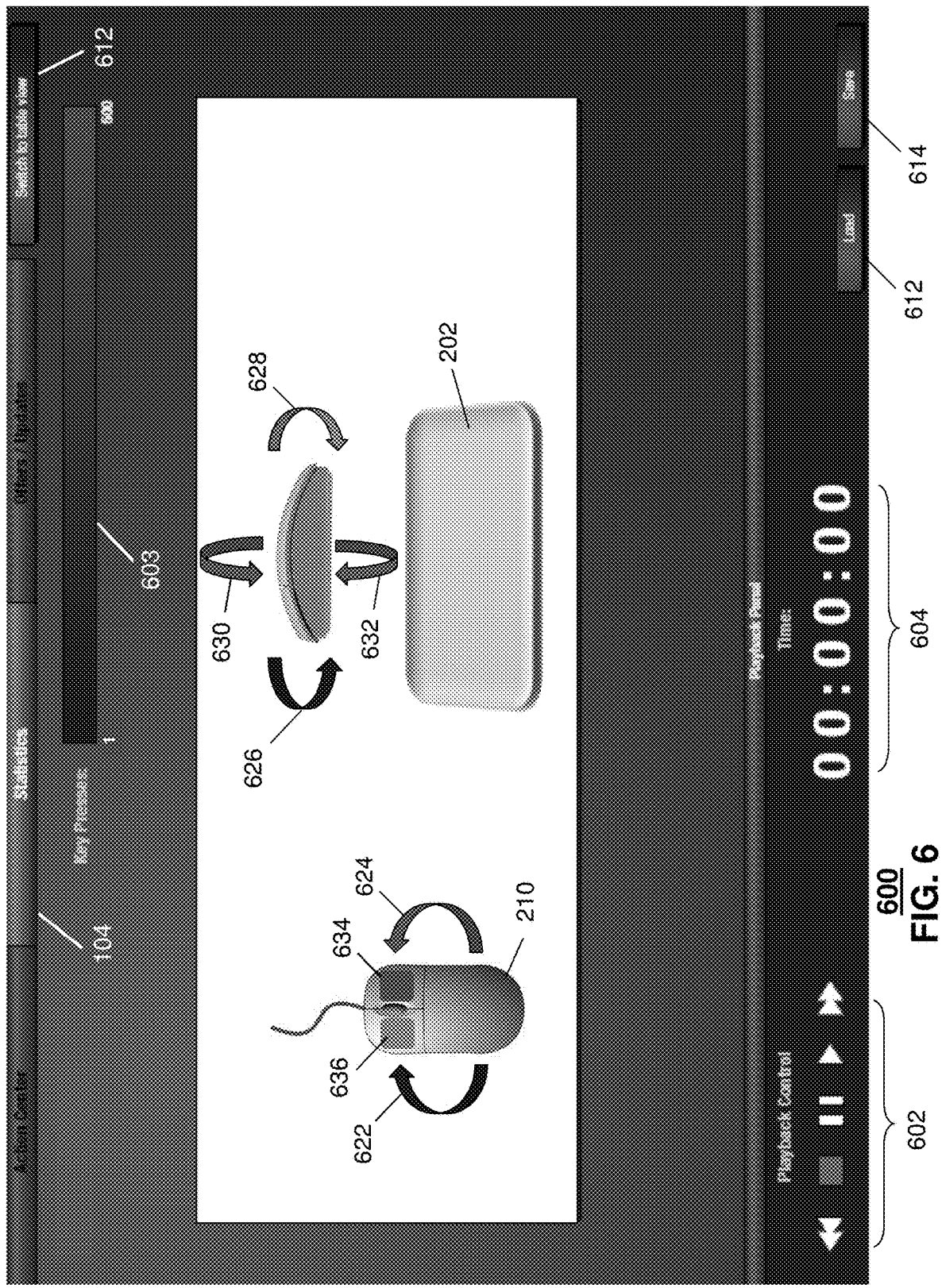
FIGS. 6-7 depict illustrative embodiments of the GUI of FIG. 1.

After completing a game, the user can select button 104 in FIG. 1, which causes the AMS application to present an updated GUI such as shown in FIG. 6, which illustrates a portion of the catalogued results. For instance, the AMS application can present a frequency of usage of the buttons of the mouse 210, and/or a frequency of two and/or three dimensional movements detected by the mouse pad 202 in step 1020 of FIG. 10.

In the illustration of FIG. 6, buttons and two and/or three dimensional movements are color-coded to illustrate the frequency of usage of mouse 210. A color scale 603 defines the frequency of usage of buttons and/or movements. The first end of the scale (navy blue) represents a single detected stimulus, while an opposite end of the scale (bright red) represents 500 detected stimuli. Based on this scale, the AMS application maps by color stimulations of the mouse 210 and two and/or three dimensional proximity data detected by the mouse pad 202. For example, counterclockwise rotation of the mouse 210 is shown in red, while clockwise rotations are shown in blue. The red indicates a high frequency of counterclockwise rotations, while blue indicates a low frequency of clockwise rotations. Color codes are also used to indicate the frequency of forward tilting 626, rear tilting 628, left banking 630, and right banking 634 of the mouse 210 relative to the mouse pad 202. Color codes can also be used to determine the frequency of use of the right button 634 and left button 636 of the mouse 210.

The AMS application provides additional functions in a playback panel of the GUI which can help a gamer understand how the color coded keys were used during an active software application such as a video game. In this section of the GUI, the AMS application can present the user with a playback control function 602 which the user can select to replay, pause, forward or rewind the usage of buttons 634, 636 and/or two or three dimensional movements of the mouse 210 from a top view or side view as shown in FIG. 6. When usage playback is selected, the user can for instance see the color coded keys highlighted in real-time with a temporary white border to visualize how the buttons 634 and 636 were selected. The user can also see the mouse 210 moving in two or three dimensional space. A time clock 604 provides the user the elapsed time of the playback sequence. Button 612 allows the user to retrieve statistics from other sessions, while button 614 provides the user a means to save statistics from a given session.

The GUI of FIG. 6 can be shown as split screens with all accessories which generated one or more detected stimulations (e.g., keyboard 108, mouse 210, mouse pad 202, and speech commands received via a headset 114), each providing statistical results depicted with color coding. Although not shown, split screen embodiments are contemplated by the present disclosure for the GUI of FIG. 6.

Figure 7:
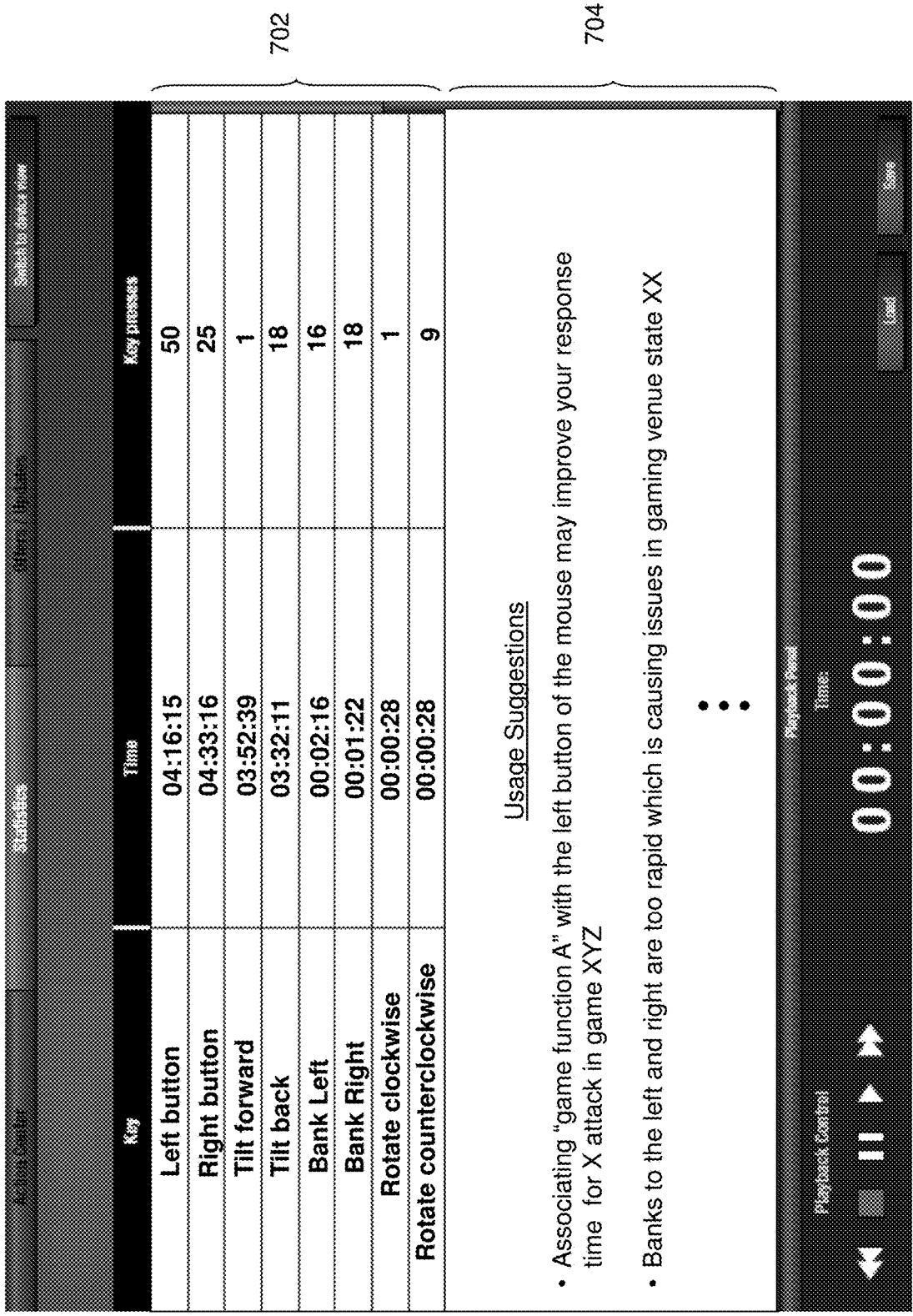

In addition to a symbolic representation as shown in FIG. 6, the AMS application can provide the gamer a means to visualize raw statistics in a table format such as shown in FIG. 7 by selecting button 612. The table format shows raw data in section 702 and possible suggestions in section 704 for improving user performance which can be generated by the AMS application. Section 702 can be presented in a table format with a column identifying the input element being analyzed, its usage, and raw frequency of usage. The user can ascertain from this table the most and least frequently used input elements as well as other identifiable patterns.

The AMS application can utilize an understanding of the layout of the accessory to determine from the statistics ways that the user can improve response time or ergonomic use. For example, the AMS application can determine a lack of usage of the left button 636 of the mouse 210. From this observation, the AMS application can suggest associating a gaming action with the button to improve the gamer's performance based on an observed behavior of the game and the gamer's actions. The AMS application can also determine that the gamer's rapid banks to the left and right may be impacting the gamer's performance in a particular venue (e.g., when flying a jet aircraft).

The AMS application can utilize present and next generation algorithms to determine how to improve response times and ergonomic usage of accessory devices. The AMS application can for example have at its disposal an understanding of the layout of each accessory and knowledge of its capabilities, the type of software being controlled by the accessory, the type of operations commonly used to control the software (e.g., known actions as shown in the actions column 130 of FIG. 1), an understanding of the associations made by other users (e.g., gamers) to improve their performance when controlling gaming software, and so on. The AMS application can also be adapted to communicate with the gaming application via an API to receive additional gaming statistics captured by the gaming application. The AMS application can also utilize statistical and behavior modeling techniques to predict the behavior of the gamer and responses from the software application to identify possible ways to improve the gamer's performance.

In addition to FIGS. 6-7, the AMS application can catalogue results as shown in FIG. 14. In this illustration, the AMS application can indicate for gaming application #1 the weapon type being tracked (e.g., sniper rifle, machine gun, hand gun). It should be noted that the communication flow diagram shown in FIG. 13 can be modified with a more comprehensive protocol that includes a weapon type being monitored, misses, non-kill hits (i.e., a hit that does not result in a kill), kill hits, and loss of life. The AMS application can calculate an average hit rate from the misses, non-kill hits, and kill hits. The AMS application can also compare these results to community ratings.

A community rating can be localized to just users of the computer 402 playing gaming application #1, or all on-line users which can span a large community of users of gaming application #1. Thus, although an average hit rate of 29% for a sniper rifle may seem low, when these statistics are compared to other members of a community, the AMS application can determine from prior performance records of members of the community (retrieved from a local or remote database) that the user's performance is in fact above average. Similar community comparisons can be performed for the weapon type "machine gun" and "hand gun". The AMS application can also monitor and track statistics of other gaming applications which may have different weapon types such as shown for gaming application #2. Similar statistics can be generated and compared to the performance of members of a community to which the gamer is associated.

From the foregoing descriptions, it would be evident to an artisan with ordinary skill in the art that the aforementioned embodiments can be modified, reduced, or enhanced without departing from the scope and spirit of the claims described below.

For example, the statistical results shown in FIG. 14 can be used to identify behavioral and/or skill patterns of a gamer. For instance, in gaming application #1 and gaming application #2, the gamer appears to perform well as a sniper and bow and arrow marksman. The AMS application can be adapted to detect these correlations to indicate a skill set of the gamer that may be consistent between different games. For example, a sniper and bowman have a similar trait that requires marksmanship, calm nerves, and knowing when to strike. This trait can be identified by the AMS application and can be used to identify other games in which the gamer may perform well. This trait can also be advertised to other gamers to promote teams.

The methods of FIGS. 8-11 can also be adapted to operate in whole or in part in a gaming accessory, in an operating system of a computer, in a gaming console, in a gaming application which runs on the computer, or in an on-line gaming application.

The method of FIG. 11 can be further adapted to ignore or filter game action results, which may not be relevant to the gamer. For instance, the AMS application can be adapted to ignore (or filter) game action results relating to navigation of the avatar (e.g., turn around, jump, etc.). The AMS application can also be adapted to ignore (or filter) game action results relating to preparatory actions such as reloading a gun, switching between weapons, and so on. In another embodiment, the AMS application can be adapted to selective monitor only particular game result actions such as misses, non-kill hits, kills, and life of the avatar. The AMS application can also be adapted to monitor gaming action results with or without temporal data associated with the stimuli and game action results.

In one embodiment, the AMS application can also be adapted to track stimuli (or substitutions thereof) by submission order, and order of gaming action results supplied by the gaming application, and perform cataloguing thereof by the respective order of stimuli and gaming action results. The items can be catalogued by the AMS application with or without temporal data.

In one embodiment, the AMS application can be adapted to collect gaming action results for "all" or a substantial portion of stimuli (or substitutions thereof) transmitted to the gaming application. In this embodiment, the AMS application can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In one embodiment, the AMS application can be adapted to substitute an accessory stimulus (or stimuli) for a macro comprising a combination of two or more substitute stimuli, and track the combination of substitute stimuli individually and as a macro when gaming action results are received from the gaming application. The AMS application can be adapted to monitor macros by tracking an order of stimuli (or substitutes) associated with the macro that are transmitted to the gaming application and by tracking an order of gaming action results received from the gaming application, which are associated with the macro. Alternatively, or in combination the AMS application can add a unique identifier to the substitute stimuli to identify the stimuli as being associated with the macro.

The AMS application can be adapted to catalogue the gaming action results associated with the macro in a manner that allows the gamer to identify a group of gaming action results as being associated with the macro. The AMS application can also be adapted to collect sufficient data to assess each individual gaming action result of the macro (e.g., temporal data, hits, misses, etc.). The presentation of catalogued macro data can be hierarchical. For example, the AMS application can present a particular macro by way of a high level GUI that indicates the macro caused a kill. The AMS application can be adapted to enable the gamer to select a different GUI that enables the user to visualize a gaming action result for each stimulus of the macro to determine how effective the macro was in performing the kill, and whether further adjustments of the macro might improve the gamer's performance.

In another embodiment, the AMS application can be adapted to define more than one programmable layer for an accessory. Such a feature can extend the functionality of an accessory into multi-layer paradigms of input functions. The GUI of FIG. 1 can be adapted so that a user can specify more than one programmable layer for a specific accessory (e.g., the mouse and mouse pad combination 115 or tablet 302. The user can also specify which layer to present in FIG. 1 while associating actions. If for instance layer 1 is shown, the GUI of FIG. 1 can present the actions associated in this layer by presenting descriptors superimposed on the input functions (e.g., buttons or keys). When the user switches to layer 2 (e.g., by selecting from a drop-down menu the layer of interest) the accessory can be shown in the GUI with a different set of associated actions. The user can define a macro or identify a key sequence to switch between layers when the accessory is in use.

The trigger for switching between layers can be a toggle function (e.g., selecting a layer button on the tablet 302) to switch between layers in a round robin fashion (layer 1→layer 2→layer 3→ to layer 1→ and so on). Alternatively, the user can define a hold and release trigger to switch between layers. In this embodiment, the user moves to another layer while pressing a button on the tablet 302 and returns to the preceding layer upon its release. In yet another embodiment, the trigger to switch layers can be defined differently per layer. The user can for example select one button in layer 1 to proceed to layer 2, and select a different button in layer 2 to return to layer 1 or proceed to yet another layer 3. There can be numerous combinations of layers and triggers which can be defined to substantially expand the capability of single accessory.

In another embodiment, the AMS application can be adapted so that a gamer can define super macros and/or super profiles. A super macro can represent nested macros (combinations of macros). AMS application can be adapted so that the gamer can customize the timing for executing nested macros. Similarly, a super profile can represent nested profiles (combinations of profiles). A super profile can for example comprise sub-profiles, each sub-profile defining associations of actions to input functions of a particular accessory. The super macros and/or profiles can be programmed into the dongle 202.

In yet another embodiment, the mouse 210 can be adapted with a proximity sensor (e.g., optical sensor, electromagnetic sensor, capacitive sensor, inductive sensor, or other suitable sensor) capable of detecting a displacement of the mouse 210 from the top surface 204 of the mouse pad 202. Depending on the proximity sensing technology used by the mouse 210, the top surface 204 of the mouse pad 202 can be adapted with materials that facilitate proximity sensing by the proximity sensor used by the mouse 210. In this embodiment, the mouse 210 provides two-dimensional coordinate movement to the computing device (e.g., gaming console 306 or computer 402) when the mouse 210 is navigating on the top surface 204 of the mouse pad 202. When the mouse 210 is lifted from the top surface 204 of the mouse pad 202, the mouse 210 can provide three-dimensional proximity data to the AMS application which can be substituted with navigation stimuli of other devices such as a joy stick 116 shown in FIG. 1 or by a suitable transcoding technique. The mouse 210 can also be adapted with an accelerometer and/or gyroscope to combine proximity data with information relating to acceleration and/or orientation of the mouse 210.

In one embodiment, the mouse pad 202 can be equipped with a touch sensitive display for communicating with the AMS application to perform associations and/or select a profile for use in a gaming application. In one embodiment, the mouse 210 can be equipped with a display for communicating with the AMS application to perform associations and/or select a profile for use in a gaming application. In one embodiment, methods 800, 900, and 1000 can be adapted for applications unrelated to gaming. For example, the angular displacement of a mouse 210 can be used to navigate through file systems and/or folders managed by an operating system.

The foregoing embodiments are a subset of possible embodiments contemplated by the present disclosure. Other suitable modifications can be applied to the present disclosure.

FIG. 15 depicts an exemplary diagrammatic representation of a machine in the form of a computer system 1500 within which a set of instructions, when executed, may cause the machine to perform any one or more of the methods discussed above. One or more instances of the machine can operate as any of devices depicted in FIGS. 1-4 and FIG. 12. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, or a solid state display. The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method, comprising:
generating, by an accessory management software (AMS) application executed by a computing device including a processor, a plurality of substitute gaming stimulations associated with a plurality of stimulus signals generated by a gaming accessory device;
adding, by the AMS application, a first unique identifier to each of the plurality of substitute gaming stimulations;
transmitting, by the AMS application, the plurality of substitute gaming stimulations to a gaming application being executed on the computing device, wherein the first unique identifier enables tracking of a plurality of gaming action results generated by the gaming application responsive to the plurality of substitute gaming stimulations transmitted to the computing device;
receiving, by the AMS application from the gaming application, the plurality of game action results, wherein each of the plurality of gaming action results comprises the first unique identifier of a corresponding one of the plurality of substitute gaming stimulations; and
presenting, by the AMS application, at a graphical user interface on a display, the plurality of gaming action results associated with the plurality of substitute gaming stimulations in slow motion.

2. The method of claim 1, further comprising:
generating, by the AMS application, a plurality of signals responsive to the plurality of gaming action results; and
transmitting, by the AMS application, the plurality of signals to present a plurality of notices representative of the plurality of gaming action results.

3. The method of claim 2, further comprising transmitting, by the AMS application, the plurality of signals to the gaming accessory device to present the plurality of notices at a graphical user interface of the gaming accessory device.

4. The method of claim 3, wherein the first unique identifier comprises a code that uniquely identifies each of the plurality of substitute gaming stimulations.

5. The method of claim 1, further comprising:
identifying, by the AMS application, a portion of the plurality of substitute gaming stimulations as a macro resulting in an identified macro, the identified macro comprising a plurality of gaming actions; and
incorporating, by the AMS application, in each substitute gaming stimulation of an identified portion a second unique identifier.

6. The method of claim 5, wherein a portion of the plurality of gaming action results comprises at least one gaming action result associated with the second unique identifier of a corresponding one of the portion of the plurality of substitute gaming stimulations.

7. The method of claim 1, further comprising providing adjustments, by the AMS application, at a graphical user interface of the gaming accessory device, to the plurality of stimulus signals associated with the plurality of substitute gaming stimulations based on the plurality of gaming action results to improve performance.

8. The method of claim 1, wherein each of the plurality of gaming action results comprises a description of a gaming action and a time when the gaming action took place.

9. A machine-readable storage device, comprising executable instructions that, when executed by a processing system including a processor, facilitate performance of operations, comprising:
generating a plurality of substitute gaming stimulations to replace a plurality of stimulus signals generated by a gaming accessory device;
adding, to each of the plurality of substitute gaming stimulations, a first unique identifier, wherein the first unique identifier of each of the plurality of substitute gaming stimulations distinguishes each of the plurality of substitute gaming stimulations from each other;
submitting the plurality of substitute gaming stimulations to a gaming application, wherein the first unique identifier of each of the plurality of substitute gaming stimulations enables tracking of a plurality of gaming action results generated by the gaming application responsive to the plurality of substitute gaming stimulations submitted to the gaming application; and
presenting, at a graphical user interface on a display, the plurality of gaming action results associated with the plurality of substitute gaming stimulations in slow motion.

10. The machine-readable storage device of claim 9, wherein the operations further comprise receiving the plurality of game action results from the gaming application, wherein each of the plurality of gaming action results comprises a corresponding first unique identifier of a corresponding one of the plurality of substitute gaming stimulations.

11. The machine-readable storage device of claim 9, wherein the operations further comprise transmitting a plurality of signals to present a plurality of notices representative of the plurality of gaming action results.

12. The machine-readable storage device of claim 11, wherein the operations further comprise:
identifying a portion of the plurality of substitute gaming stimulations as a macro comprising a plurality of gaming actions resulting in an identified macro; and
incorporating in each substitute gaming stimulation of the identified macro a second unique identifier.

13. The machine-readable storage device of claim 12, wherein a portion of the plurality of gaming action results comprises at least one gaming action result associated with the second unique identifier of a corresponding one of the portion of the plurality of substitute gaming stimulations.

14. The machine-readable storage device of claim 9, wherein the operations further comprise providing adjustments, at a graphical user interface, to the plurality of stimulus signals associated with the plurality of substitute gaming stimulations based on the plurality of gaming action results to improve performance.

15. A computing device, comprising:
a processing system including a processor;
a memory that stores executable instructions that, when executed by the processing system, facilitate performance of operations, comprising:
generating a plurality of substitute gaming stimulations to replace a plurality of stimulus signals generated by a gaming accessory device, wherein each of the plurality of substitute gaming stimulations includes a first unique identifier;
submitting the plurality of substitute gaming stimulations to a gaming application, wherein the first unique identifier of each of the plurality of substitute gaming stimulations enables tracking of a plurality of gaming action results generated by the gaming application;
generating an updated plurality of gaming action results by associating each of the plurality of gaming action results with the first unique identifier of a corresponding one of the plurality of substitute gaming stimulations;
cataloging the updated plurality of gaming action results for a record of a user's performance; and
instructing the gaming application to present, at a graphical user interface on a display, the plurality of gaming action results associated with the plurality of substitute gaming stimulations in slow motion.

16. The computing device of claim 15, wherein the first unique identifier comprises a code that uniquely identifies each of the plurality of substitute gaming stimulations.

17. The computing device of claim 15, wherein the operations further comprise transmitting a plurality of signals to present a plurality of notices representative of the plurality of gaming action results cataloged in the record for the user.

18. The computing device of claim 15, wherein the operations further comprise:
identifying a portion of the plurality of substitute gaming stimulations as a macro comprising a plurality of gaming actions resulting in an identified macro; and
incorporating in each substitute gaming stimulation of the identified macro a second unique identifier.

19. The computing device of claim 18, wherein the operations further comprise associating each gaming action result of a portion of the plurality of gaming action results with the second unique identifier of a corresponding one of the portion of the plurality of substitute gaming stimulations.

20. The computing device of claim 15, wherein the operations further comprise providing adjustments, at the graphical user interface, to the plurality of stimulus signals associated with the plurality of substitute gaming stimulations based on the plurality of gaming action results to improve performance.

\* \* \* \* \*